US012462375B2

(12) United States Patent
Vukovic et al.

(10) Patent No.: US 12,462,375 B2
(45) Date of Patent: Nov. 4, 2025

(54) METHODS TO AUTOMATICALLY ADJUST ONE OR MORE PARAMETERS OF A CAMERA SYSTEM FOR OPTIMAL 3D RECONSTRUCTION OF FEATURES FORMED WITHIN/ON A SEMICONDUCTOR SUBSTRATE

(71) Applicant: Tokyo Electron Limited, Tokyo (JP)

(72) Inventors: Mirko Vukovic, Albany, NY (US); Ryan Lloyd, Chaska, MN (US)

(73) Assignee: Tokyo Electron Limited, Tokyo (JP)

( * ) Notice: Subject to any disclaimer, the term of this patent is extended or adjusted under 35 U.S.C. 154(b) by 543 days.

(21) Appl. No.: 17/881,881

(22) Filed: Aug. 5, 2022

(65) Prior Publication Data

US 2024/0046446 A1 Feb. 8, 2024

(51) Int. Cl.
*G06T 7/00* (2017.01)
*G06T 7/80* (2017.01)
*G06T 15/00* (2011.01)

(52) U.S. Cl.
CPC .............. *G06T 7/001* (2013.01); *G06T 7/80* (2017.01); *G06T 15/00* (2013.01); *G06T 2207/30148* (2013.01)

(58) Field of Classification Search
CPC . G06T 7/80; G06T 15/00; G06T 2207/30148; G06T 2207/10148; G06T 2207/30168; G06T 7/571; H04N 23/60; H04N 23/74; H04N 23/56
See application file for complete search history.

(56) References Cited

U.S. PATENT DOCUMENTS

| | | | | |
|---|---|---|---|---|
| 5,835,227 A | * | 11/1998 | Grodnensky | ....... G03F 7/70058 356/399 |
| 7,570,797 B1 | * | 8/2009 | Wang | ...................... G06F 18/40 356/237.4 |
| 9,025,852 B2 | | 5/2015 | Hisano et al. | |

(Continued)

OTHER PUBLICATIONS

Zhu et al., "Optical Wafter Defect Inspection at the 10nm Technology Node and Beyond", International Journal of Extreme Manufacturing, Topical Review, Apr. 2022, 25 pgs.

*Primary Examiner* — Matthew C Bella
*Assistant Examiner* — Janice E. Vaz
(74) *Attorney, Agent, or Firm* — Egan, Enders & Huston LLP.

(57) ABSTRACT

Embodiments of systems and methods are disclosed for inspecting features formed within and/or on a semiconductor substrate. More specifically, the present disclosure provides various embodiments of systems and methods to automatically adjust one or more parameters (or camera settings) used by a camera system to capture a stack of images of a feature formed within and/or on a semiconductor substrate before the images are processed to generate a three-dimensional (3D) reconstruction of the feature. In some embodiments, the disclosed systems and methods may filter the images included within the stack of images used for 3D reconstruction and dynamically determine when the camera system has captured enough images for 3D reconstruction of the feature. In doing so, the disclosed systems and methods may provide a more complete and accurate 3D reconstruction of the feature, while improving throughput of the wafer inspection process.

16 Claims, 13 Drawing Sheets

(56) References Cited

U.S. PATENT DOCUMENTS

| | | | |
|---|---|---|---|
| 2006/0098861 A1* | 5/2006 | See | G01B 11/08 382/145 |
| 2007/0064224 A1* | 3/2007 | Kreh | G01N 21/9501 356/237.2 |
| 2007/0233739 A1* | 10/2007 | John | G06T 11/005 |
| 2012/0092546 A1* | 4/2012 | Borovytsky | G02B 21/244 348/E5.045 |
| 2016/0253813 A1* | 9/2016 | Hou | G01N 21/9501 382/106 |
| 2016/0360091 A1* | 12/2016 | Lindskog | H04N 23/676 |
| 2018/0322623 A1 | 11/2018 | Memo et al. | |
| 2022/0230314 A1* | 7/2022 | Klaerner | G06V 10/141 |

* cited by examiner

METHODS TO AUTOMATICALLY ADJUST ONE OR MORE PARAMETERS OF A CAMERA SYSTEM FOR OPTIMAL 3D RECONSTRUCTION OF FEATURES FORMED WITHIN/ON A SEMICONDUCTOR SUBSTRATE

BACKGROUND

The present disclosure relates to the inspection of substrates. In particular, it provides a novel system and method to adjust parameters used by a camera system to capture images of features formed within and/or on a semiconductor substrate. In one embodiment, the system and method disclosed herein may be utilized before, during or after processing semiconductor substrates, such as semiconductor wafers, within a substrate processing system.

Traditional substrate processing systems utilize photolithography processes, which include photoresist coating, exposure, and photoresist develop steps. The materials and processes utilized in these steps may all impact film thickness, critical dimension targeting, line roughness, and uniformity on a substrate. As geometries in substrate processing continue to shrink, the technical challenges to forming structures on substrates increase.

In conventional substrate processing systems, a wafer inspection system (WIS) is often used to inspect a semiconductor substrate (e.g., a semiconductor wafer) during or after one or more processing steps are performed. For example, a wafer inspection system may be used to determine a film thickness (FT) of a layer applied to a surface of a wafer after the wafer is subject to a Post Apply Bake (PAB) procedure to cure or harden the layer. In another example, a wafer inspection system may be used to determine a critical dimension (CD) of a structure (e.g., lines, trenches, vias, contacts, etc.) formed on the wafer after the wafer is developed to form the structure. In some cases, data obtained by the wafer inspection system may be provided to an advanced process control (APC) system for process control and/or to a fault detection system to detect defects on the wafer.

Some wafer inspection system (WIS) modules may utilize three-dimensional (3D) reconstruction to analyze features (e.g., layers, structures and/or defects) formed within and/or on a semiconductor substrate. These WIS modules may capture and use a stack of images (or image slices), which are taken at various locations (e.g., camera poses, distances or heights) relative to the feature, to build a 3D reconstruction of the feature. When a 3D reconstruction of a defect is generated, the WIS module may use the 3D reconstruction to classify the defect and determine its severity.

Conventional WIS modules providing 3D reconstruction may generally include a stage or support structure upon which a semiconductor substrate is mounted and an inspection camera, which is mounted above the stage for capturing images of the semiconductor substrate at various positions. In some WIS modules, the stage may be translated vertically and/or horizontally to move the semiconductor wafer relative to the inspection camera, while the inspection camera captures a predetermined number of images (e.g., 20 images) of the feature at a predetermined set of locations (e.g., predetermined set of heights relative to the feature) using camera settings, which were predetermined and set before the images are captured. Unfortunately, this method of reconstruction may obtain images that do not capture the feature well or do not add any useful information to the 3D reconstruction.

A need, therefore, remains for an improved system and method for optimizing the 3D reconstruction of features formed within/on a semiconductor substrate.

SUMMARY

Various embodiments of systems and methods are disclosed herein for inspecting features formed within and/or on a semiconductor substrate. More specifically, the present disclosure provides various embodiments of systems and methods to automatically adjust one or more parameters (or camera settings) used by a camera system to capture a stack of images of a feature formed within and/or on a semiconductor substrate before the images are processed to generate a 3D reconstruction of the feature. In some embodiments, the disclosed systems and methods may also filter the images included within the stack of images used for reconstruction and dynamically determine when the camera system has captured enough images for 3D reconstruction of the feature. In doing so, the disclosed systems and methods may be used to provide a more complete, accurate 3D reconstruction of the feature, while improving throughput of the wafer inspection process.

According to one embodiment, a method is provided herein for inspecting features formed within and/or on a semiconductor substrate. The method may generally include capturing a stack of images of a feature formed within and/or on the semiconductor substrate using a camera system, wherein the camera system utilizes a plurality of parameters to capture the stack of images; and analyzing one or more images in the stack of images, during or after said capturing the stack of images, to determine if one or more of the parameters used by the camera system should be adjusted to capture the feature more accurately. If said analyzing determines that one or more of the parameters should be adjusted, the method may further include: determining optimum settings for the one or more parameters to capture the feature more accurately, and automatically adjusting the one or more parameters in accordance with the optimum settings before the camera system is utilized to capture additional images of the feature. On the other hand, if said analyzing determines that the one or more parameters used by the camera system do not need adjustment, the method may further include processing the stack of images to generate a three-dimensional (3D) reconstruction of the feature.

In some embodiments, as each image within the stack of images is captured, the method may further include: filtering each image to determine whether: (a) the image should be included within the stack of images and used in the 3D reconstruction of the feature, or (b) the image should be discarded from the stack of images; dynamically determining when a sufficient number of images have been included within the stack of images for the 3D reconstruction of the feature; and processing the stack of images to generate the 3D reconstruction of the feature when the sufficient number of images have been included within the stack of images.

In some embodiments, after automatically adjusting the one or more parameters in accordance with the optimum settings, the method may further include: capturing the additional images of the feature formed within and/or on the semiconductor substrate using the camera system, and analyzing the additional images to determine if one or more of the parameters used by the camera system should be adjusted to capture the feature more accurately. The additional images may be images that are included within: (a) the stack of images, or (b) a new stack of images captured after the stack of images. If said analyzing the additional images determines that the one or more parameters used by the camera system do not need adjustment, the method may further include processing the stack of images or the new stack of images to generate a three-dimensional (3D) reconstruction of the feature. On the other hand, if said analyzing the additional images determines that the one or more parameters used by the camera system should be adjusted to capture the feature more accurately, the method may further include repeating said determining optimum settings for the one or more parameters, said automatically adjusting the one or more parameters in accordance with the optimum settings, said capturing the additional images of the feature, and said analyzing the additional images until said analyzing determines that the one or more parameters used by the camera system do not need adjustment.

A wide variety of parameters may be adjusted in the method described herein. In some embodiments, the one or more parameters used by the camera system may include one or more of the following: illumination intensity, illumination shape, pupil illumination sigma, focus height, aperture, exposure time, image resolution and camera pose. Other parameters not specifically mentioned herein may also be adjusted.

According to another embodiment, a method is provided herein to automatically adjust an illumination intensity used by a camera system to capture a stack of images of a feature formed within/on a semiconductor substrate. In general, the method may include: providing a semiconductor substrate within a chamber having a stage for supporting the substrate and a camera system for capturing images of a feature formed within/on the semiconductor substrate, wherein the stage and/or the camera system is configured to move the semiconductor substrate relative to the camera system; capturing a test image of the feature formed within/on the semiconductor substrate when the stage and/or the camera system is set to an initial position; capturing another test image of the feature after the stage and/or the camera system is adjusted to a new position; analyzing the test images to determine an ideal illumination intensity that provides optimum image quality; and automatically adjusting an illumination intensity used by the camera system to the ideal illumination intensity before a focus scan is performed to capture the stack of images of the feature formed within/on the substrate.

In some embodiments, the method may further include performing the focus scan to capture the stack of images of the feature formed within/on the substrate, wherein the focus scan is performed using the ideal illumination intensity. In such embodiments, the method may further include: analyzing the stack of images captured during the focus scan to determine image quality; and processing the stack of images to generate a three-dimensional (3D) reconstruction of the feature if the image quality is determined to be sufficient.

In some embodiments, if the image quality is determined to be insufficient, the method may further include: automatically adjusting the illumination intensity used by the camera system to a new illumination intensity; performing a focus scan to capture a new stack of images of the feature formed within/on the substrate, wherein the focus scan is performed using the new illumination intensity; and analyzing the new stack of images captured during the focus scan to determine image quality.

In some embodiments, the method may repeat said automatically adjusting the illumination intensity used by the camera system to a new illumination intensity, said performing a focus scan to capture a new stack of images of the feature formed within/on the substrate, and said analyzing the new stack of images captured during the focus scan to determine image quality until the image quality is determined to be sufficient.

In some embodiments, the method may further include processing the new stack of images to generate a 3D reconstruction of the feature when the image quality is determined to be sufficient.

According to yet another embodiment, a method is provided herein to adjust a shape of off-axis illumination used by a camera system to capture a stack of images of a feature formed within/on a semiconductor substrate. In general, the method may include: capturing a first set of images ($I_i$) of the feature while illuminating the feature at each of a plurality of off-axis illumination locations, which are spaced across an aperture of the camera system; analyzing each image of the first set of images to obtain information content ($S_i$) for illumination detected from the feature when illuminated at each of the first plurality of off-axis illumination locations; interpolating the information content ($S_i$) obtained from the first set of images ($I_i$) across the aperture of the camera system to estimate an information surface for the illumination detected from the feature across the aperture; identifying a first point (A) corresponding to a maximum value of the information surface; capturing a first additional image ($I_A$) of the feature while illuminating the feature from an off-axis illumination location corresponding to the first point (A); analyzing the first additional image ($I_A$) to obtain information content ($S_A$) for the illumination detected from the feature when illuminated from the off-axis illumination location corresponding to the first point (A); interpolating the information content ($S_i+S_A$) obtained from the first set of images ($I_i$) and the first additional image ($I_A$) across the aperture of the camera system to estimate a new information surface for the illumination detected from the feature across the aperture; and using the new information surface to define the shape of the off-axis illumination.

In some embodiments, the method may further include: performing a focus scan to capture the stack of images of the feature formed within/on a semiconductor substrate, wherein the focus scan is performed using the shape of the off-axis illumination defined by the new information surface; and processing the stack of images captured during the focus scan to generate a three-dimensional (3D) reconstruction of the feature.

In some embodiments, before using the new information surface to define the shape of the off-axis illumination, the method may further include determining if a termination condition has been satisfied for a metric of image quality determined for the first additional image ($I_A$). In some embodiments, said using the new information surface to define the shape of the off-axis illumination may only performed only if the termination condition has been satisfied.

If the termination condition has not been satisfied, the method may further include: identifying a second point (B) corresponding to a maximum value of the new information surface; capturing a second additional image ($I_B$) of the feature while illuminating the feature from an off-axis illumination location corresponding to the second point (B); analyzing the second additional image ($I_B$) to obtain information content ($S_B$) for the illumination detected from the feature when illuminated from the off-axis illumination location corresponding to the second point (B); interpolating the information content ($S_i+S_A+S_B$) obtained from the first set of images ($I_i$), the first additional image ($I_A$) and the second additional image ($I_B$) across the aperture of the camera system to estimate a new information surface for the illumination detected from the feature across the aperture; determining if the termination condition has been satisfied for the metric of image quality determined for the second additional image ($I_B$); and using the new information surface to define the shape of the off-axis illumination only if the termination condition has been satisfied.

In some embodiments, the method may further include: performing a focus scan to capture the stack of images of the feature formed within/on a semiconductor substrate, wherein the focus scan is performed using the shape of the off-axis illumination defined by the new information surface; and processing the stack of images captured during the focus scan to generate a three-dimensional (3D) reconstruction of the feature.

In some embodiments, the method may further include: repeating said identifying, said capturing, said analyzing, said interpolating and said determining until the termination condition has been satisfied; and using the new information surface to define the shape of the off-axis illumination once the termination condition has been satisfied.

BRIEF DESCRIPTION OF THE DRAWINGS

A more complete understanding of the present inventions and advantages thereof may be acquired by referring to the following description taken in conjunction with the accompanying drawings, in which like reference numbers indicate like features. It is to be noted, however, that the accompanying drawings illustrate only exemplary embodiments of the disclosed concepts and are therefore not to be considered limiting of the scope, for the disclosed concepts may admit to other equally effective embodiments.

DETAILED DESCRIPTION

The present disclosure provides various embodiments of systems and methods for inspecting features formed within and/or on a semiconductor substrate. More specifically, the present disclosure provides various embodiments of systems and methods to automatically adjust one or more parameters (or camera settings) used by a camera system to capture a stack of images of a feature formed within and/or on a semiconductor substrate before the images are processed to generate a three-dimensional (3D) reconstruction of the feature. In some embodiments, the disclosed systems and methods may also filter the images included within the stack of images used for reconstruction and dynamically determine when the WIS module has captured enough images for 3D reconstruction of the feature. In doing so, the disclosed systems and methods may be used to provide a more complete, accurate 3D reconstruction of the feature, while improving throughput of the wafer inspection process.

Figure 1:
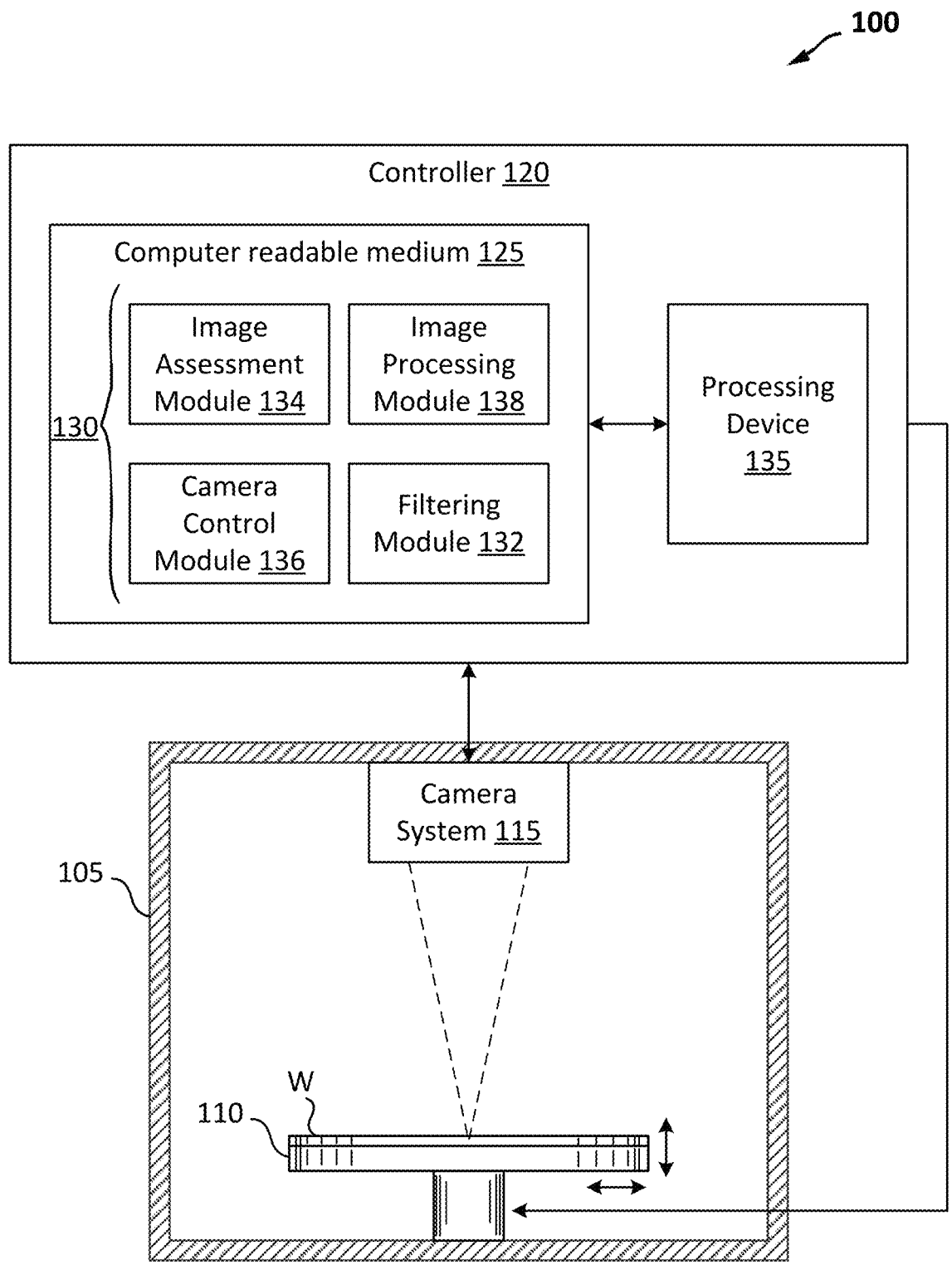
FIG. 1 is a block diagram of a wafer inspection system (WIS) module having a camera system and a controller in accordance with one embodiment of the present disclosure.

FIG. 1 illustrates one embodiment of a wafer inspection system (WIS) module 100 that may utilize 3D reconstruction to analyze features formed within and/or on a semiconductor substrate after one or more processing steps have been performed to process the semiconductor substrate. More specifically, FIG. 1 illustrates one embodiment of a WIS module 100 that uses a camera system 115 to capture images of a feature formed within/on a semiconductor substrate, and a controller 120 to control various components of the WIS module 100 and/or process the images captured by the camera system 115 to provide 3D reconstruction of the feature.

The WIS module 100 shown in FIG. 1 may generally be used to inspect a wide variety of features, which may be formed within and/or on a semiconductor substrate (such as a semiconductor wafer). In some embodiments, the WIS module 100 may be used to detect and analyze defects that may be formed on a surface of the semiconductor substrate and/or within one or more layers of the semiconductor substrate. In other embodiments, the WIS module 100 may be used to inspect various layers included within the semiconductor substrate. In yet other embodiments, the WIS module 100 may be used to inspect various structures (e.g., lines, trenches, vias, contacts, etc.) formed on or within the semiconductor substrate.

In some embodiments, WIS module 100 shown in FIG. 1 may be integrated within a substrate processing system for inspecting semiconductor substrates as they are processed within the substrate processing system. In other embodiments, WIS module 100 may be a stand-alone module located outside of a substrate processing system. It will be recognized, however, that the WIS module 100 shown in FIG. 1 is merely exemplary and that the methods described herein may be used within other embodiments of WIS modules (or other processing modules, chambers or tools) that utilize a camera system and a controller to provide 3D reconstruction of features formed within/on a semiconductor substrate.

As shown in FIG. 1, the WIS module 100 is bounded by an outer wall 105 and includes a stage 110 for supporting a semiconductor substrate W (e.g., a semiconductor wafer), while the substrate is disposed within the WIS module for inspection, and a camera system 115 for capturing images of the substrate. In some embodiments, the camera system 115 may be coupled to an inner surface of the outer wall 105 and may be positioned above the semiconductor substrate W for capturing images of at least a portion of the substrate, as shown in FIG. 1. It will be recognized, however, that the camera position shown in FIG. 1 is merely one example, and that camera system 115 may be alternatively positioned within the WIS module 100 (or another processing module, chamber or tool), in other embodiments.

To generate a 3D reconstruction of the feature, the camera system 115 may capture a stack of images of the feature, where each image in the stack of images is obtained at a different position (e.g., a different height, camera pose and/or tilt) relative to the feature provide a different view of the feature. Capturing a stack of images comprising different views of the feature enables the images to be accumulated and processed together to generate a 3D reconstruction of the feature being inspected. In one embodiment, the camera system 115 may capture a stack of images of a feature at a variety of different heights (relative to the feature) to generate a plurality of image slices through the feature. In one embodiment, a minimum step size between image slices may be as small as 10 nm. Other step sizes may also be used.

A variety of methods may be used to obtain a stack of images at different positions. In some embodiments, the stage 110 may be a robotic stage, which may be translated vertically and/or horizontally to move the semiconductor substrate W relative to the camera system 115 while the camera system 115 captures the stack of images of the feature. In other embodiments, the stage 110 may be fixed and the camera system 115 may be translated vertically and/or horizontally relative to the semiconductor substrate W. In some embodiments, the stage 110, the camera system 115 and/or various components of the camera system 115 may be rotated or tilted to capture images of the feature at different angles.

It is noted that camera system 115 may utilize a wide variety of camera systems, including but not limited to, charged coupled device (CCD) image sensor cameras, complementary metal oxide semiconductor (CMOS) image sensor cameras, N-type metal-oxide-semiconductor (NMOS) image sensor cameras, indium gallium arsenide (InGaAs) image sensor cameras, indium antimony (InSb) image sensor cameras, etc.

Regardless of the type of camera system utilized, camera system 115 may generally include a light source for illuminating the semiconductor substrate W and a photoreceptive sensor for detecting light reflected from the semiconductor substrate W. In some embodiments, the light source included within camera system 115 may be a light source of the ultraviolet (UV) spectrum or longer wavelengths. For example, light sources in the UV spectrum, visible spectrum, and infrared (IR) spectrum represent exemplary light sources that may be used within camera system 115 to illuminate the semiconductor substrate W. The photoreceptive sensor (e.g., CCD, CMOS, NMOS, etc.) of camera system 115 detects light reflected from the semiconductor substrate W and converts the detected light into a line scan or matrix of raw image values. In one embodiment, camera system 115 may include an ultraviolet light source (such as, e.g., a 192 nm DUV laser light source) and an UV image sensor camera for illuminating the semiconductor substrate W with UV light and detecting UV light reflected from the substrate. The raw image values output from the camera system 115 may be provided to the controller 120 for further processing.

Figure 2:
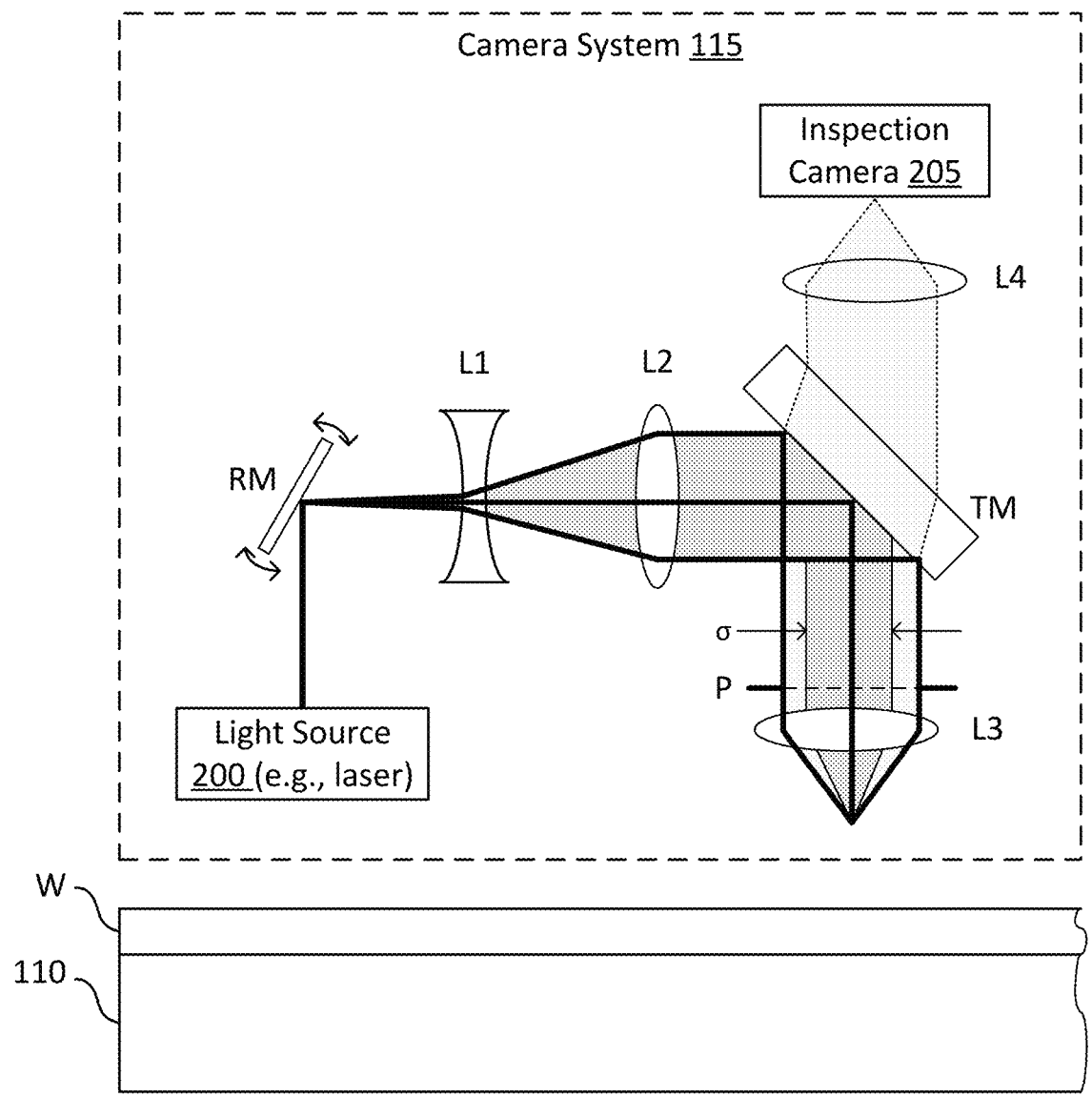
FIG. 2 is a block diagram illustrating one embodiment of the camera system shown in FIG. 1.

FIG. 2 is a block diagram illustrating one embodiment of a camera system, which may be used to capture a stack of images of a feature formed within/on a semiconductor substrate. The camera system 115 shown in FIG. 2 may be within the WIS module 100 or another processing module, chamber or tool. In the embodiment shown in FIG. 2, camera system 115 utilizes optics (e.g., a plurality of mirrors and lens) to provide off-axis illumination to the semiconductor substrate W. As used herein, "off-axis illumination" refers to illumination that is not axisymmetric full pupil illumination. Off-axis illumination can be axisymmetric (such as, e.g., annular) or have a rotational symmetry by some angle of rotation (e.g., 180° for dipole or 90° for quadrupole). Off-axis illumination can also have other regular or irregular shapes, which can be rotationally symmetric, or asymmetric, such as bean shaped. By providing off-axis illumination, the camera system 115 shown in FIG. 2 generates images with improved contrast compared to camera systems that utilize full pupil illumination.

In the example embodiment shown in FIG. 2, camera system 115 includes a light source 200 (e.g., a laser light source) for providing illumination and a rotatable mirror (RM) for directing the illumination provided by the light source 200 through one or more lens (e.g., L1 and L2) to a transmission mirror (TM), which is positioned to redirect the illumination toward the semiconductor substrate W. The illumination directed toward the semiconductor substrate W passes through a pupil (P) before it is focused by another lens (L3) to an illumination location on the substrate. In the embodiment shown in FIG. 2, the illumination directed toward the semiconductor substrate W may be adjusted in focus height, illumination intensity, pupil illumination shape and/or pupil illumination sigma ($\sigma$), where the pupil illumination sigma corresponds to the portion of the pupil illuminated by the illumination. When illuminated with less than full pupil illumination sigma ($\sigma$), the camera system 115 provides off-axis illumination through the pupil (P), which is focused by the lens (L3) to an off-axis illumination location on the substrate W. Light reflected from the semiconductor substrate W passes back through the lens (L3) and the transmission mirror (TM) before it is focused by lens (L4) onto the photoreceptive sensor (e.g., a CCD, CMOS, NMOS, etc., image sensor) of the inspection camera 205.

It is noted that the controller 120 shown in FIG. 1 can be implemented in a wide variety of manners. In one embodiment, the controller 120 may be coupled and configured to control various parameters (or camera settings) used by the camera system 115 to capture a stack of images of a feature formed within/on the semiconductor substrate W, and may process the images captured by the camera system 115 to provide 3D reconstruction of the feature. For example, the controller 120 may be a computer system (or an integrated circuit board) including a computer readable medium 125 having a plurality of software modules 130 stored therein and a processing device 135 configured to execute program instructions contained within the plurality of software modules 130 to analyze the images captured by the camera system 115 and automatically adjust one or more parameters (or camera settings) of the camera system 115 based on such analysis. In some embodiments, the processing device 135 may execute additional program instructions to control other components within the WIS module 100 (such as, e.g., a robotic stage). In other embodiments, the controller 120 may be a computer system (or integrated circuit board), which is separate and distinct from the computer readable medium 125 and the processing device 135 shown in FIG. 2. In such embodiments, the controller 120 may be coupled and configured to control certain components of the WIS module 100 (such as, e.g., a robotic stage), while the computer readable medium 125 and the processing device 135 store and execute the software modules 130 used to control the camera system 115 and the processing of images obtained thereby.

It is further noted that the processing device 135 shown in FIG. 1 can also be implemented in a wide variety of manners. In one embodiment, processing device 135 may include one or more programmable integrated circuits, which are programmed to provide the functionality described herein. For example, one or more processors (e.g., a microprocessor, microcontroller, central processing unit (CPU), digital signal processor (DSP), etc.), programmable logic devices (e.g., a complex programmable logic device (CPLD), field programmable gate array (FPGA), etc.), and/or other programmable integrated circuits (e.g., an application specific integrated circuit (ASIC), etc.) can be configured to execute the software modules 130 (and/or other program instructions) stored within the computer readable medium 125 to implement the functionality described herein.

It is further noted that the computer readable medium 125 shown in FIG. 1 may be implemented as one or more non-transitory computer readable mediums. Examples of a non-transitory computer readable medium include, but are not limited to, computer readable memory (e.g., read only memory (ROM), random access memory (RAM), flash memory, etc.) and computer readable storage devices (e.g., hard disk drives (HDD), solid state drives (SDD), floppy disks, DVDs, CD-ROMs, etc.). Other variations could also be implemented.

As noted above, conventional WIS modules providing 3D reconstruction may generally include a robotic stage upon which a semiconductor substrate is mounted and an inspection camera, which is mounted above the robotic stage for capturing a stack of images of a feature formed within/on the semiconductor substrate at various positions. In some conventional WIS modules, the robotic stage may be translated vertically and/or horizontally to move the semiconductor substrate relative to the inspection camera, while the inspection camera captures a predetermined number of images (e.g., 20 images) of the feature at a predetermined set of locations (e.g., a predetermined set of heights relative to the feature) using predetermined camera settings. Unfortunately, as stated above, this method of reconstruction often obtains images that do not capture the feature well, or do not add any useful information to the 3D reconstruction.

Like conventional WIS modules, the WIS module 100 shown in FIG. 1 includes a stage 110 (e.g., a robotic stage) configured to support a semiconductor substrate W (e.g., a semiconductor wafer) while the semiconductor substrate is disposed within the WIS module 100 for inspection and a camera system 115, which is mounted above the stage 110 for capturing a stack of images of a feature formed within/on the semiconductor substrate W at various positions relative to the feature. In the WIS module 100, the stage 110 and/or the camera system 115 may be translatable, and thus, may be configured to move the semiconductor substrate W relative to the camera system 115, or vice versa.

Unlike conventional WIS modules, the WIS module 100 shown in FIG. 1 includes a plurality of software modules 130 (or program instructions) that may be executed by the processing device 135 to: (a) filter images obtained from the feature to ensure that only "good" images are used for 3D reconstruction, (b) analyze images to determine optimum parameters (or camera settings) that should be used to capture the feature more accurately in new images, (c) automatically adjust one or more parameters of the camera system 115 in accordance with the optimum settings before capturing new images of the feature and processing the new images to generate a 3D reconstruction of the feature, and (d) dynamically determining when a sufficient number of images have been obtained for 3D reconstruction of the feature. In doing so, the WIS module 100 shown in FIG. 1 and described herein may be used to accelerate wafer inspection and obtain better images for 3D reconstruction of features formed within/on a semiconductor substrate without operator intervention or oversight.

As shown in FIG. 1, the plurality of software modules 130 stored within the computer readable medium 125 may generally include, but are not limited to, a filtering module 132, an image assessment module 134, a camera control module 136 and an image processing module 138.

Figure 4:
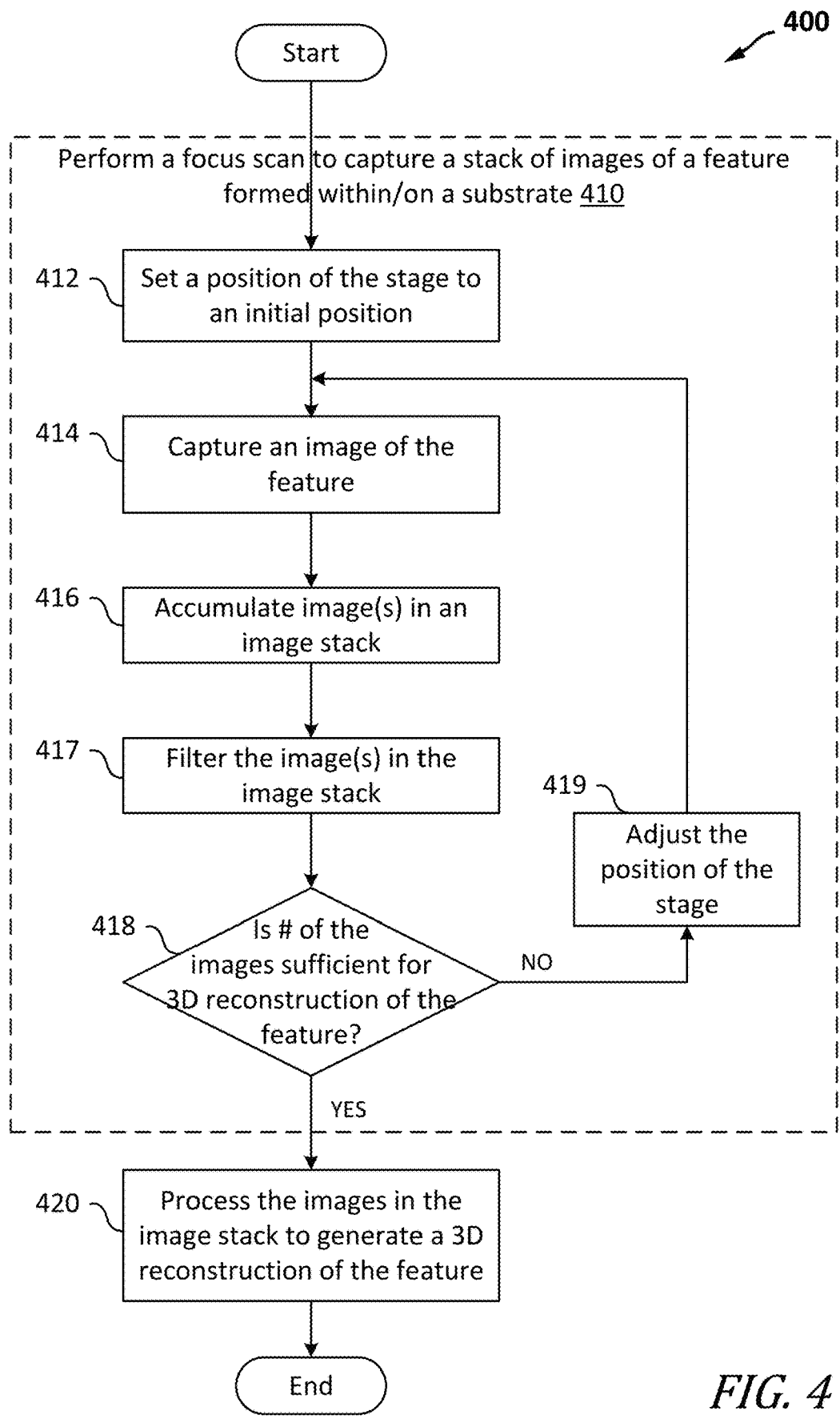
FIG. 4 is a flowchart diagram illustrating another embodiment of a method that may be used to generate a 3D reconstruction of a feature formed within/on a semiconductor substrate.

The filtering module 132 can be executed by the processing device 135 during or after a focus scan is performed to capture a stack of images of a feature formed within/on the semiconductor substrate W. The filtering module 132 determines which images in the stack of images to use within the 3D reconstruction, and dynamically determines when the camera system 115 has captured enough images to provide a suitably complete 3D reconstruction of the feature. In some embodiments, for example, the filtering module 132 may be executed by the processing device 135 to perform one or more of the following filtering functions: (a) keep "good" images in the stack of images (such as, e.g., high quality images that capture the feature well), (b) discard "bad" images in the stack of images that are likely to corrupt the 3D reconstruction (such as, e.g., images that only partially capture a feature, or images that have quality issues), (c) compile a list of "good" images in the stack of images to be used for 3D reconstruction, (d) assign weights to the images in the stack of images (e.g., weights that specify whether or not geometrical information is provided within the image for the feature), and (e) dynamically determine when a sufficient number of images have been captured by the camera system 115 to provide a suitably complete 3D reconstruction of the feature. FIG. 4 illustrates one embodiment of a method 400 that may utilize the filtering module 132 to perform various filtering functions described herein.

Figure 5:
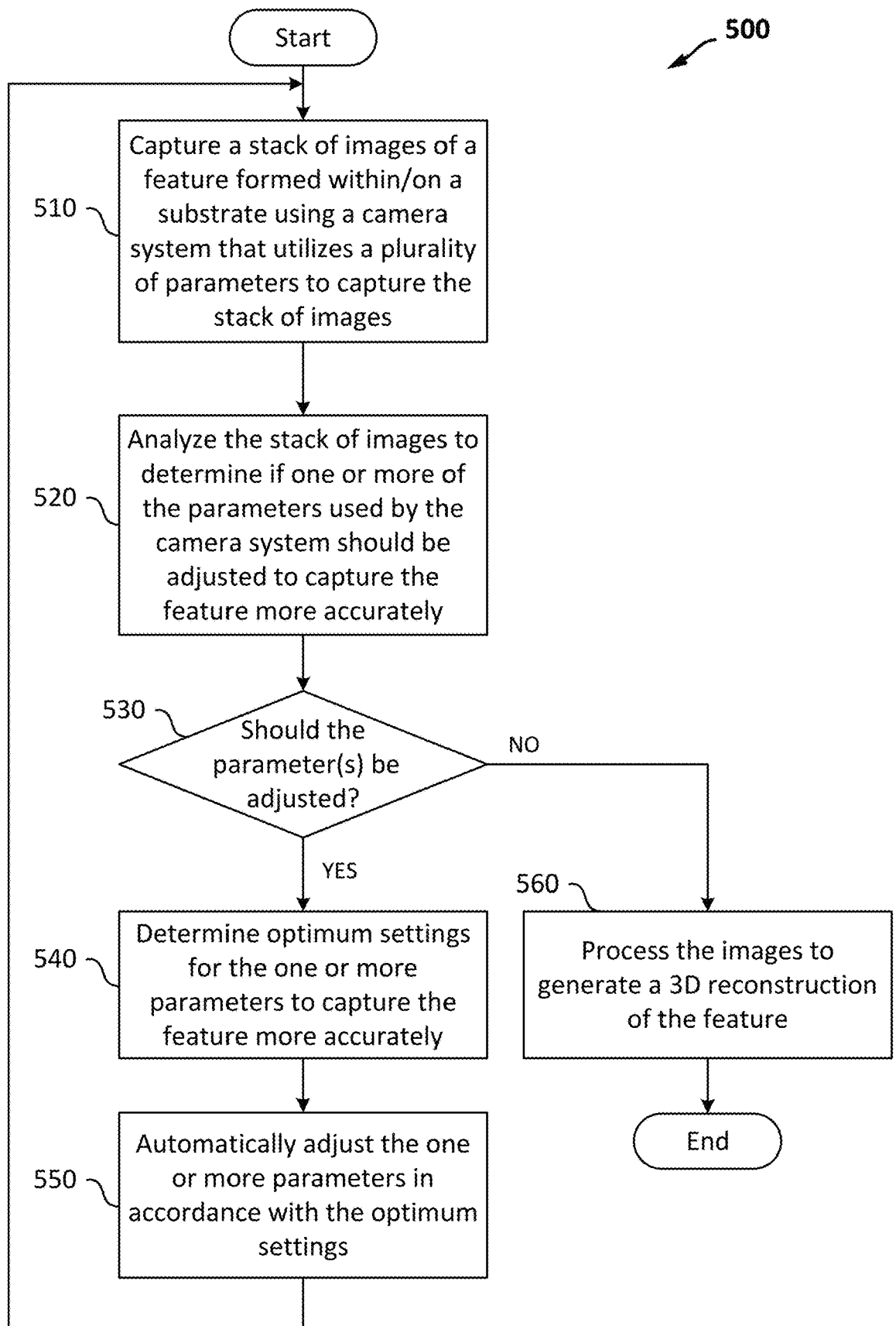
FIG. 5 is a flowchart diagram illustrating one embodiment of a method that may be used to inspect features formed within and/or on a semiconductor substrate.

The image assessment module 134 may be executed by the processing device 135 before, during or after a focus scan is performed to capture a stack of images of a feature formed within/on the semiconductor substrate W. The image assessment module 134 analyzes images obtained from the feature and uses heuristics to determine optimum parameters (or camera settings) that should be used for imaging the feature. In some embodiments, for example, the image assessment module 134 may be executed by the processing device 135 to analyze a previous stack of images obtained for a feature (e.g., a stack of images obtained during a focus scan or during a test scan performed prior to a focus scan) to determine if one or more parameters (or camera settings) should be adjusted for a next stack of images obtained for the feature. FIG. 5 illustrates one embodiment of a method 500 that may use the image assessment module 134 to identify parameters needing adjustment and to automatically adjust the identified parameters prior to capturing a next stack of images for the feature.

In some embodiments, the image assessment module 134 may determine that adjustment of image parameter(s) is needed to: (a) improve the quality (e.g., the contrast, signal-to-noise ratio (SNR), pixel saturation, dynamic range, focus, etc.) of the next stack of images obtained for the feature, (b) select an ideal image resolution (or pixel size) for imaging the feature, (c) suggest different camera poses or rotating mirror (RM) tilt angles for imaging the feature, and/or (d) suggest additional camera poses for imaging unexplored areas of the semiconductor substrate W.

In one implementation, the image assessment module 134 may determine which image parameter(s) should be adjusted to improve the quality of the images obtained for the feature, thereby providing greater quality of 3D reconstruction. For example, the image assessment module 134 may analyze images obtained from the feature and may use heuristics to determine the optimum illumination intensity, pupil illumination shape pupil illumination sigma and/or focus height. In some embodiments, the image assessment module 134 may analyze images obtained from the feature and may use heuristics to determine the optimum aperture, exposure time, image resolution/pixel size and/or camera pose that should be used to provide high quality images of the feature.

Figure 6:
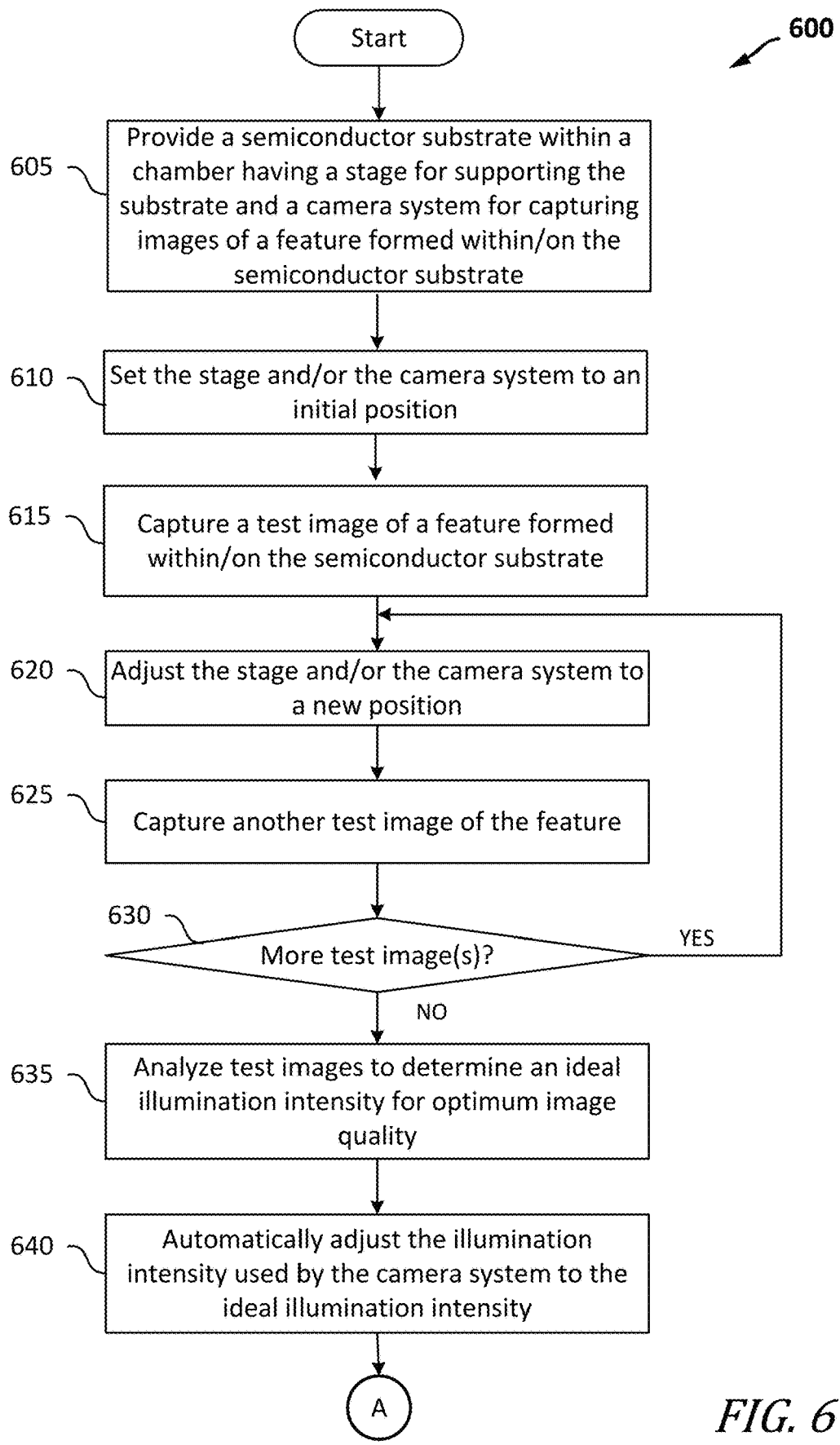
FIG. 6 is a flowchart diagram illustrating one embodiment of a method that may be used to automatically adjust the illumination intensity used by a camera system to improve the quality of the images obtained for a feature before the images are processed to generate a 3D reconstruction of the feature.
Figure 6:
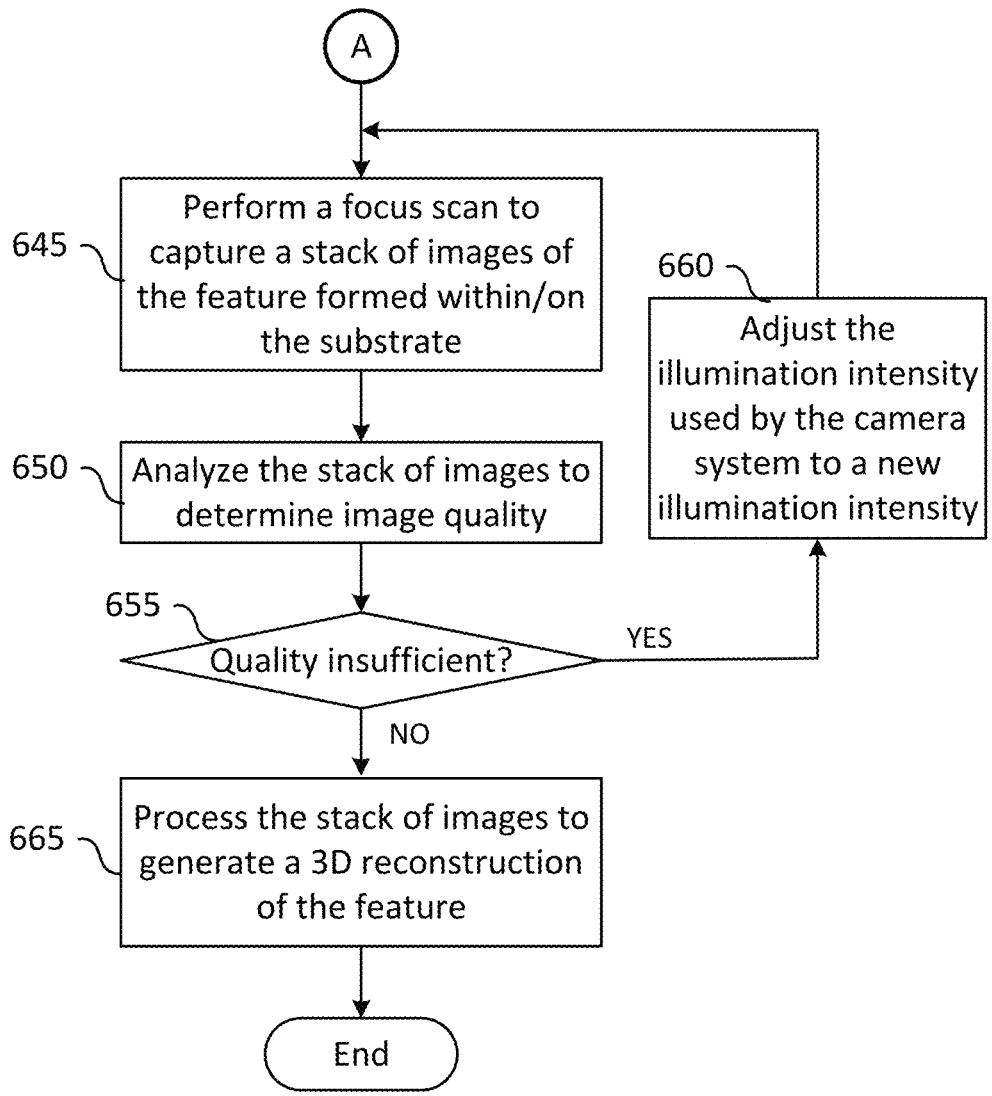

In one implementation, the image assessment module 134 may improve image quality by automatically adjusting the illumination intensity used by the camera system 115 to capture images of the feature with maximum dynamic range and SNR. In one example implementation, the image assessment module 134 may utilize a set of images obtained from the feature at two different positions (e.g., a nominal height and a lowest height) to build a histogram of illumination intensities, analyze the distribution of illumination intensities to watch for/detect over-saturation and narrow dynamic range and automatically adjust the illumination intensity to provide maximum dynamic range and SNR. Once a focus scan is performed to capture a stack of images of the feature, the image assessment module 134 may assess the images in the image stack for pixel saturation and dynamic range, and may dynamically adjust the illumination intensity during the focus scan (or may repeat the focus scan) based on the assessment. FIG. 6 illustrates one embodiment of a method 600 that may use the image assessment module 134 to automatically adjust the illumination intensity of the camera system 115, as described herein.

In another implementation, the image assessment module 134 may improve image quality by automatically adjusting the shape of the illumination used by the camera system 115 to capture images of the feature. As known in the art, various illumination shapes may be used to illuminate a substrate, including full pupil illumination, lithography masks and arbitrary illumination. In some embodiments, the image assessment module 134 may adapt the illumination shape to the shape of the feature to improve dynamic range and SNR.

Figure 7:
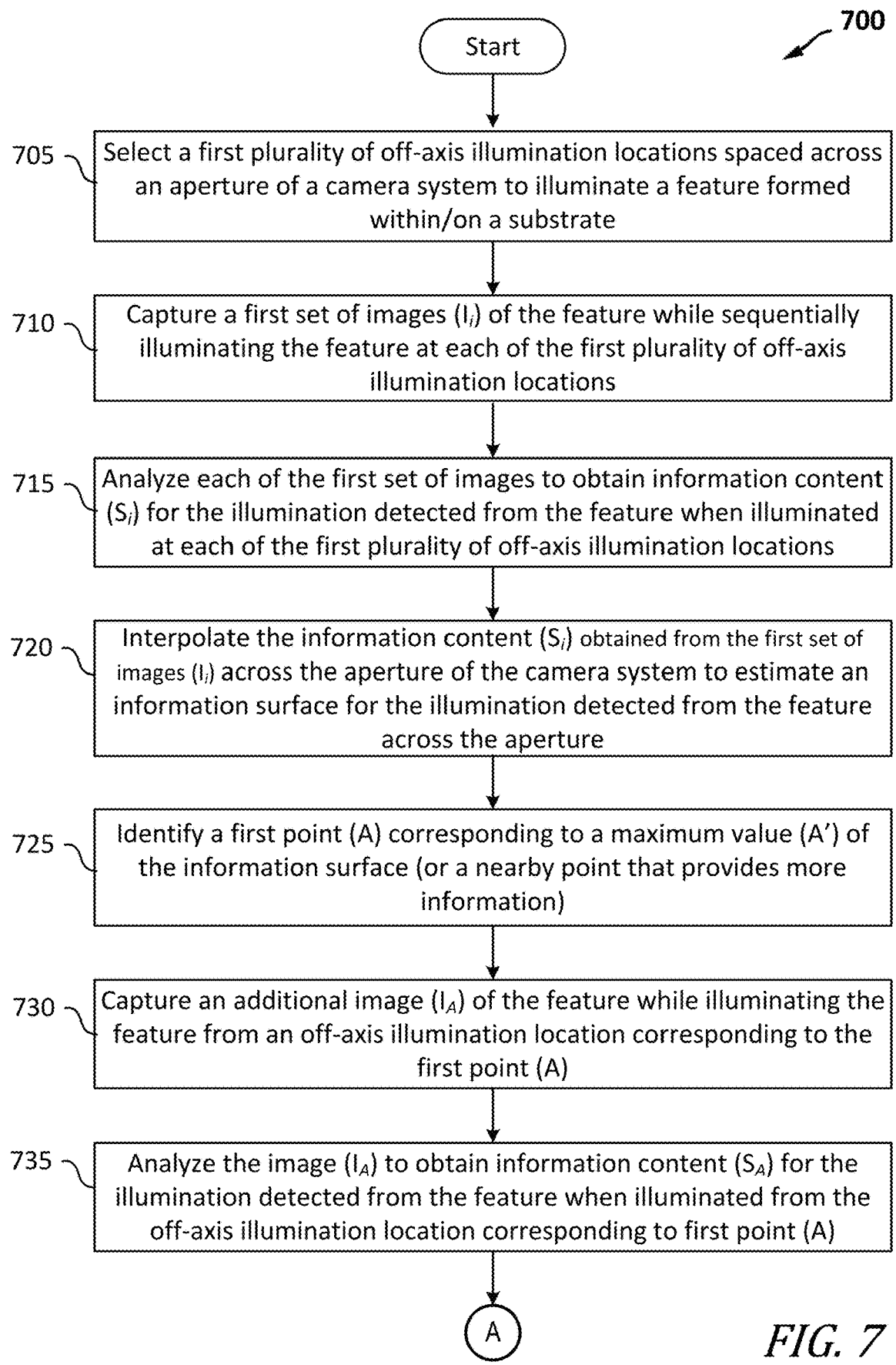
FIG. 7 is a flowchart diagram illustrating one embodiment of a method that may be used to automatically adjust the shape of the off-axis illumination used by a camera system to improve the quality of the images obtained for a feature before the images are processed to generate a 3D reconstruction of the feature.
Figure 7:
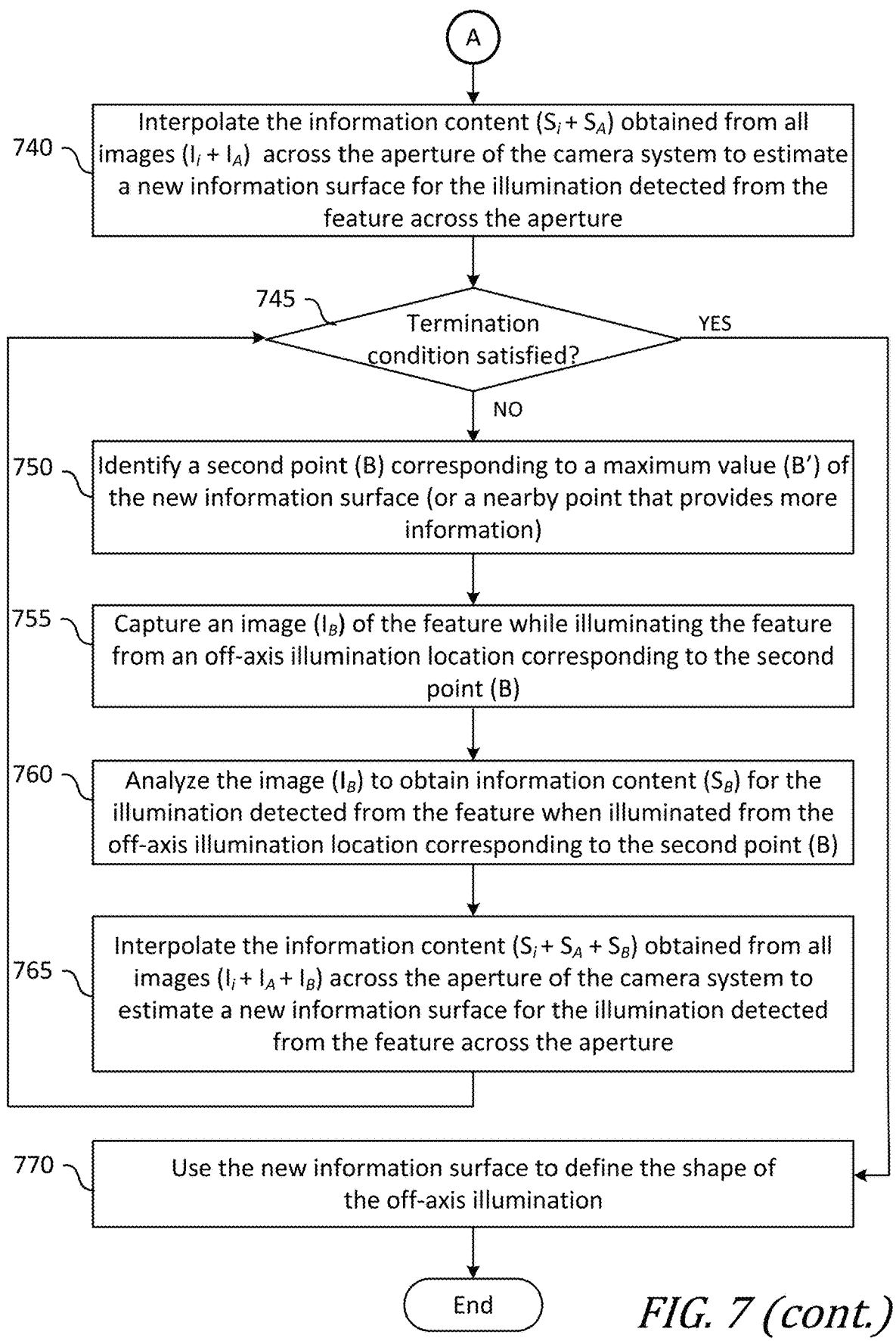

In one example implementation, the camera system 115 shown in FIG. 2 may utilize off-axis illumination having arbitrary illumination shape and intensity, and the image assessment module 134 may dynamically adapt the shape of the off-axis illumination to the feature's shape to optimize the illumination used by the camera system 115 to capture the images of the feature. For example, the camera system 115 may illuminate the feature from a plurality (e.g., 3-4) off-axis illumination locations spaced across an aperture of the camera system 115, and may capture images of the feature when illuminated from each location. The image assessment module 134 may analyze the images obtained from each location to estimate an information surface for the illumination detected from the feature across the aperture, and may use the information surface to define the shape of the off-axis illumination. In some embodiments, the camera system 115 may capture additional image(s) of the feature while the feature is illuminated from one or more additional off-axis illumination locations, and the image assessment module 134 may analyze the additional image(s) obtained from each location to iteratively and automatically adjust the shape of the off-axis illumination to optimize the image quality. FIG. 7 illustrates one embodiment of a method 700 that may use the image assessment module 134 to automatically adjust the illumination shape used by the camera system 115, as described herein.

In another implementation, the image assessment module 134 may change the image resolution/pixel size to ideally capture a feature. Some features may require a higher resolution image to capture the feature, while other features may be captured using a lower resolution, which leads to faster reconstruction. For example, since the image resolution is directly impacted by the size of the feature, a relatively high resolution image may be needed to capture relatively small features, while lower resolution images can be used to capture larger features. Each image has a conversion of real world units (e.g., nanometers, nm) per pixel. In some embodiments, the image assessment module 134 dynamically selects the ideal resolution for a given feature. In one example implementation, the image assessment module 134 may rate or score images obtained at different resolutions and may dynamically select the resolution with the highest score considering image size, speed and new detail gathered.

In another implementation, the image assessment module 134 may perform auto focus, for example, by performing a 2D discrete Fourier analysis on each image in a set of images. In doing so, the image assessment module 134 may determine which image is most in-focus by finding the image with the highest amplitude of high frequency components. In one example implementation, the image assessment module 134 may apply a mask that delineates the feature from the remainder of the image content and may perform a 2D discrete Fourier analysis on just the feature to select the image in which the feature is most in-focus. Such analysis may enable the image assessment module 134 to iteratively determine the ideal focal length, which captures the feature with the sharpest clarity.

In some embodiments, the image assessment module 134 may detect the geometry of a feature, including likely areas of self-occlusion and shadows, and may use the detected geometry to suggest different camera poses or rotating mirror (RM) tilt angles for obtaining better images of the feature.

In some embodiments, the image assessment module 134 may maintain a voxel grid of the feature and surrounding areas. A voxel grid is a 3D cube, where each cube is a voxel of predetermined size (e.g., $nm^3$ or $\mu m^3$). In one implementation, a voxel grid may be generated from a stack of images using weights assigned by the filter module 132 to specify whether or not geometrical information is provided within the image(s) for a feature. For example, a voxel grid generated from a stack of images may contain a "0" for an unfilled voxel (indicating the feature is not present within the voxel) and a "1" for a filled voxel (indicating at least a portion of the feature is present within the voxel). In some embodiments, the image assessment module 134 may use the voxel grid to identify unexplored areas of the semiconductor substrate W and/or the feature, and may suggest different camera poses or rotating mirror (RM) tilt angles for capturing the unexplored areas and/or the feature.

The camera control module 136 may be executed by the processing device 135 before, during or after a focus scan is performed to capture a stack of images of a feature formed within/on the semiconductor substrate W. The camera control module 136 automatically adjusts one or more parameters (or camera settings) based on the analysis performed by the image assessment module 134 without operator intervention or oversight. In some embodiments, the parameters (or camera settings) that may be automatically adjusted by the camera control module 136 include, but are not limited to, illumination intensity, pupil illumination shape, pupil illumination sigma, focus height, aperture, exposure time, image resolution/pixel size, and/or camera pose.

The image processing module 138 may be executed by the processing device 135 after a focus scan is performed to capture a stack of images of a feature formed within/on the semiconductor substrate W. The image processing module 138 processes the stack of images to provide a 3D reconstruction of the feature. By utilizing the filtering module 132, the image assessment module 134 and the camera control module 136 to optimize the images included within the stack of images prior to 3D reconstruction, the WIS module 100 described herein optimizes the 3D reconstruction provided by the image processing module 138 while improving throughput.

FIGS. 3-7 illustrate various methods that may be used by the WIS module 100 shown in FIG. 1 to optimize the 3D reconstruction of features formed within and/or on a semiconductor substrate. Although discussed in the context of WIS module 100, the methods shown in FIGS. 3-7 may be utilized within other semiconductor processing modules, chambers or tools having a camera system and a controller, as described herein.

It is recognized that the methods shown in FIGS. 3-7 are merely exemplary and additional methods may utilize the techniques described herein. It is further noted that additional steps may be added to the methods shown in FIGS. 3-7 as the steps described are not intended to be exclusive. Moreover, the order of the steps is not limited to the order shown in FIGS. 3-7 as different orders may occur and/or various steps may be performed in combination or at the same time. Further, the techniques provided herein may omit some of the steps shown in FIGS. 3-7.

Figure 3:
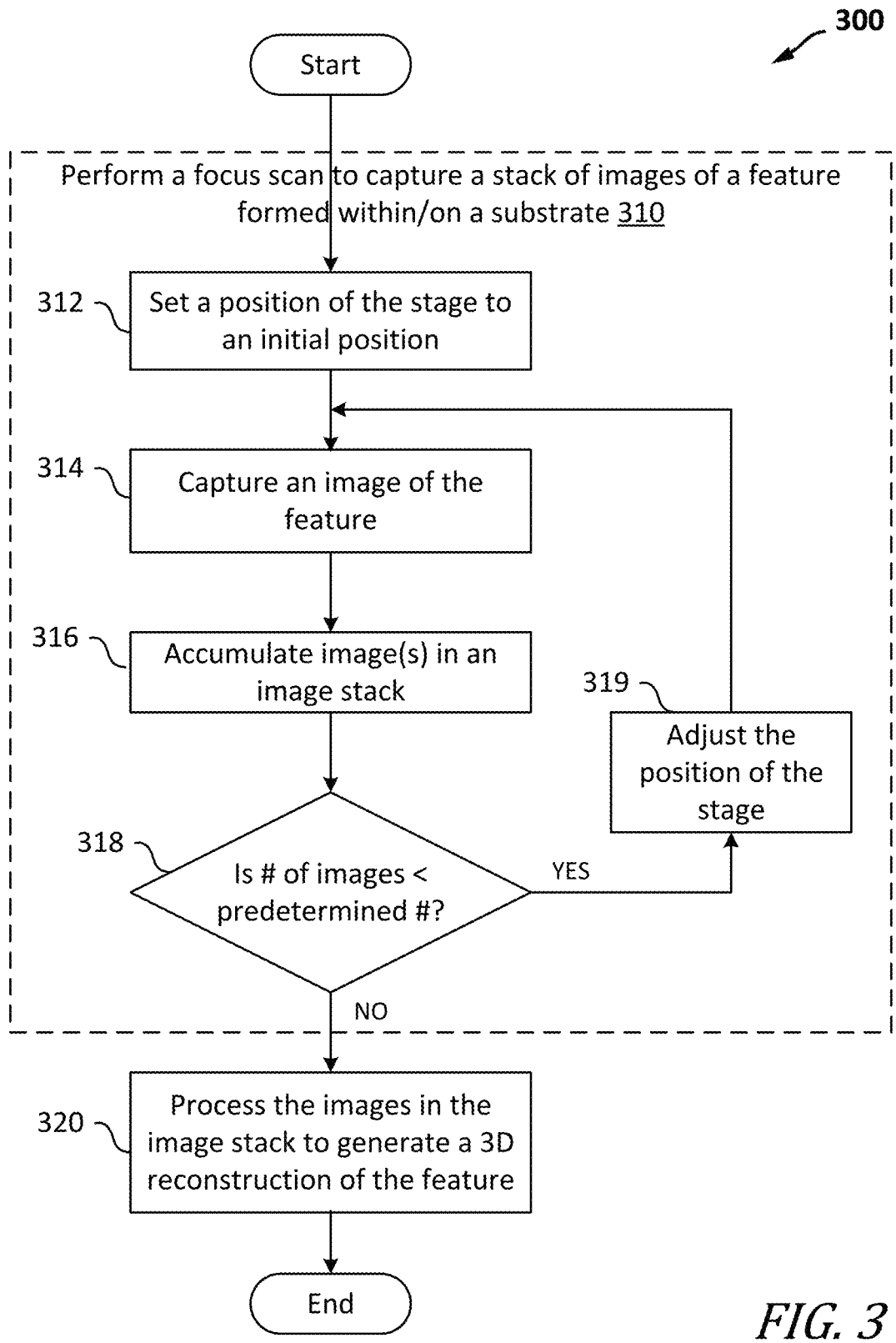
FIG. 3 is a flowchart diagram illustrating one embodiment of a method that may be used to generate a 3D reconstruction of a feature formed within/on a semiconductor substrate.

FIG. 3 illustrates one embodiment of a method 300 that may be used to generate a 3D reconstruction of a feature formed within/on a semiconductor substrate. The method 300 may generate a 3D reconstruction of a feature by performing a focus scan to capture a stack of images of the feature (in step 310) and processing the images in the image stack to generate the 3D reconstruction of the feature (in step 320). In the embodiment shown in FIG. 3, the focus scan is performed (in step 310) by setting a position of a stage on which the semiconductor substrate is mounted to an initial position (in step 312), capturing an image of the feature (in step 314) and accumulating the image in an image stack (in step 316). Next, the method 300 may determine if the number of images in the image stack is less than a predetermined number of images (e.g., 20 images) in step 318. If the number of images in the image stack is less than the predetermined number of images (YES branch of step 318), the method 300 may adjust the position of the stage (in step 319) and repeat steps 314, 316 and 318 to capture and accumulate additional image(s) until the predetermined number of images is obtained. If the number of images in the image stack is greater than or equal to the predetermined number of images (NO branch of step 318), the method 300 may process the images in the image stack to generate the 3D reconstruction of the feature (in step 320).

FIG. 3 illustrates an embodiment of a method 300 that may be used to perform a focus scan, which captures a predetermined number of images (e.g., 20 images) of a feature at a predetermined set of locations and generates a 3D reconstruction of the feature without filtering the images obtained during the focus scan. While WIS module 100 may utilize such a method, in some embodiments, throughput may be improved by filtering the images obtained during the focus scan (so that only "good" images are used for 3D reconstruction and "bad" images are discarded) and by dynamically determining when a sufficient number of "good" images have been captured to provide a complete 3D reconstruction of the feature.

FIG. 4 illustrates another embodiment of a method 400 that may be used to generate a 3D reconstruction of a feature formed within/on a semiconductor substrate. Like the method 300 shown in FIG. 3, the method 400 shown in FIG. 4 may generate a 3D reconstruction of a feature formed within/on a semiconductor substrate by performing a focus scan to capture a stack of images of the feature (in step 410) and processing the images in the image stack to generate the 3D reconstruction of the feature (in step 420).

In the embodiment shown in FIG. 4, however, the focus scan is performed (in step 410) by setting a position of a stage on which the semiconductor substrate is mounted to an initial position (in step 412), capturing an image of the feature (in step 414), accumulating the image(s) in an image stack (in step 416) and filtering the image(s) in the image stack (in step 417). In some embodiments, the image(s) in the image stack may be filtered (in step 417) by performing one or more of the following filtering functions: (a) keeping "good" images in the stack of images (such as, e.g., high quality images that capture the feature well), (b) discarding "bad" images in the stack of images that are likely to corrupt the 3D reconstruction (such as, e.g., images that only partially capture a feature, or images that have quality issues), and (c) compiling a list of "good" images in the stack of images to be used for 3D reconstruction.

Next, the method 400 may determine if the number of "good" images in the image stack is sufficient for a complete 3D reconstruction of the feature (in step 418). If the number of images in the image stack is not sufficient (NO branch of step 418), the method 400 may adjust the position of the stage (in step 419) and repeat steps 414, 416, 417 and 418 to capture, accumulate and filter additional image(s) until a sufficient number of "good" images is obtained for 3D reconstruction. Once the number of "good" images in the image stack is determined to be sufficient (YES branch of step 418), the method 400 may process the "good" images in the image stack to generate the 3D reconstruction of the feature (in step 420).

FIG. 4 illustrates an embodiment of a method 400 that may be used to filter images during a focus scan and to dynamically determine when enough "good" images have been captured to provide a complete 3D reconstruction of the feature. The method 400 shown in FIG. 4 may improve the quality of the images included within the 3D reconstruction and may reduce throughput of the wafer inspection process by using only "good" images in the 3D reconstruction (which may reduce the number of images needed to complete the 3D reconstruction) and/or by avoiding the need to perform additional focus scan(s) to capture new images.

FIG. 5 illustrates a method 500 that may be used to inspect features formed within and/or on a semiconductor substrate in accordance with one embodiment of the present disclosure. As described in more detail below, the method 500 shown in FIG. 5 may analyze a previous stack of images obtained for a feature to determine if one or more parameters used by a camera system should be automatically adjusted before the camera system is used to capture a next stack of images for the feature. In the embodiment of the method 500 shown in FIG. 5, the stack of images is analyzed and the one or more parameters used by the camera system are automatically adjusted (if needed) after the stack of images is captured by the camera system. In other embodiments, however, the method 500 shown in FIG. 5 may be modified, so that one or more images are analyzed and one or more parameters used by the camera system are automatically adjusted (if needed) as a stack of images is being captured.

In some embodiments, the method 500 may begin (in step 510) by capturing a stack of images of a feature formed within/on a semiconductor substrate using a camera system that utilizes a plurality of parameters to capture the stack of images. In some embodiments, the method 500 may capture the stack of images (in step 510) while performing a focus scan, as described above in step 310 of FIG. 3 or step 410 of FIG. 4. In other embodiments, the method 500 may capture the stack of images (in step 510) while performing test scan run prior to a focus scan.

Next, the method 500 analyzes the stack of images to determine if one or more of the parameters used by the camera system should be adjusted to capture the feature more accurately (in step 520), and determines if the one or more parameters should be adjusted (in step 530) based on the analysis performed in step 520. A wide variety of mathematical techniques (e.g., Fourier analysis, the sum of the mean square slope, gradient descent with a cost function, etc.) may be used to analyze the images (in step 520) and determine if one or more of the parameters should be adjusted (in step 530).

In some embodiments, the method 500 may determine that the parameters do not need to be adjusted (NO branch of step 530) and may process the images in the stack of images to generate a 3D reconstruction of the feature (in step 560).

In other embodiments, the method 500 may determine that one or more of the parameters should be adjusted (YES branch of step 530) based on the analysis performed in step 520. For example, the method 500 may determine that one or more parameters should be adjusted (YES branch of step 530) to: (a) improve the quality (e.g., the signal-to-noise ratio (SNR), pixel saturation, dynamic range, focus, etc.) of the next stack of images obtained for the feature, (b) select an ideal image resolution (or pixel size) for imaging the feature, (c) suggest different camera poses or rotating mirror (RM) tilt angles for imaging the feature, and/or (d) suggest additional camera poses for imaging unexplored areas of the semiconductor substrate.

If the method 500 determines that adjustment is needed for one or more parameters (YES branch of step 530), the method 500 determines optimum settings for the one or more parameters to capture the feature more accurately in a new stack of images (in step 540) and automatically adjusts the one or more parameters in accordance with the optimum settings (in step 550) before the camera system is utilized to capture the new stack of images of the feature (in step 510).

In some embodiments, the method 500 may analyze the stack of images (in step 520) and use heuristics to determine optimum settings for one or more parameters (in step 540) that enable the camera system to obtain higher quality images of the feature. For example, the method 500 may determine optimum settings for the illumination intensity, pupil illumination shape, pupil illumination sigma, focus height, aperture, exposure time, image resolution/pixel size and/or camera pose in step 540 based on the analysis performed in step 520. In some embodiments, the method 500 may use techniques from machine learning to provide intelligent guesses to suggest ideal settings for one or more of the parameters to obtain the best images of a feature.

After capturing a new stack of images (in step 510), the method 500 may repeat steps 520 and 530 (and possibly steps 540 and 550) until the method 500 determines that no further adjustment of parameters is needed (NO branch of step 530). When this occurs, the method 500 may process the images in the new stack of images to generate a 3D reconstruction of the feature (in step 560).

A variety of parameters may be adjusted in step 550 including, but not limited to, the illumination intensity, pupil illumination shape, pupil illumination sigma, aperture, focal length, exposure time, image resolution/pixel size, camera pose, etc. In some embodiments, the method 500 may automatically adjust the intensity of the illumination used by the camera system (in step 550) to capture images of the feature with maximum dynamic range and SNR. In other embodiments, the method 500 may automatically adjust the shape of the illumination to the feature's shape (in step 550) to optimize the illumination used by the camera system to capture images of the feature. In other embodiments, the method 500 may automatically adjust the pupil illumination sigma (in step 550) to further optimize the illumination used by the camera system to capture images of the feature. In yet other embodiments, the method 500 may automatically adjust the image resolution/pixel size (in step 550) to ideally capture the feature, depending on the size of the feature. In additional embodiments, the method 500 may automatically adjust the focal length of the camera system (in step 550) to capture the feature with the sharpest clarity. In yet further embodiments, the method 500 may automatically adjust the pose of the camera system or the orientation of the optics contained therein (in step 550) to capture better images of the feature, or to capture images of unexplored areas surrounding the feature.

Unlike conventional methods that capture images of a feature using predetermined parameters (or camera settings), the method 500 shown in FIG. 5 dynamically adjusts parameters "on the fly," and as needed, to obtain the best quality images for a particular feature. The method 500 shown in FIG. 5 may be performed before, during or after a focus scan is performed to capture a stack of images used for 3D reconstruction of the feature. In doing so, the method 500 shown in FIG. 5 improves the quality of the images used in the 3D reconstruction and improves throughput of the wafer inspection process by avoiding operator intervention (e.g., to manually adjust parameters) and reducing the need for additional focus scans.

FIG. 6 illustrates one embodiment of a method 600 that may be used to automatically adjust an illumination intensity used by a camera system to capture a stack of images of a feature formed within/on a semiconductor substrate before the images are processed to generate a 3D reconstruction of the feature. In the method 600 shown in FIG. 6, the illumination intensity is adjusted before a focus scan is performed to capture a stack of images of the feature. It is noted, however, that method 600 may be used to adjust the illumination intensity before, during or after a focus scan is performed to capture a stack of images of the feature.

In some embodiments, the method 600 may begin (in step 605) by providing a semiconductor substrate within a chamber having a stage (such as, e.g., the stage 110 shown in FIG. 1) for supporting the substrate and a camera system (such as, e.g., camera system 115) for capturing images of a feature formed within/on the semiconductor substrate. In some embodiments, the chamber may be a wafer inspection system (WIS) module (such as, e.g., WIS module 100), as shown in FIGS. 1 and 2 and discussed above. In other embodiments, the chamber may be a processing chamber of a semiconductor fabrication tool. Regardless, the stage and/or the camera system may be translatable to move the semiconductor substrate relative to the camera system, or vice versa. In some embodiments, the stage may be a robotic stage, which may be translated vertically and/or horizontally to move the semiconductor substrate relative to the camera system while the camera system captures images of the feature formed within/on the semiconductor substrate. In other embodiments, the stage may be fixed and the camera system may be translated vertically and/or horizontally relative to the semiconductor substrate.

After the semiconductor substrate is provided within the chamber (in step 610) and mounted on the stage, the method 600 may set the stage and/or the camera system to an initial position (e.g., a nominal height or distance between the stage and the camera system) (in step 610), and may capture a test image of a feature formed within/on the semiconductor substrate (in step 615). Next, the method 600 may adjust the stage and/or the camera system to a new position (e.g., a lowest height or distance between the stage and the camera system) (in step 620), and may capture another test image of the feature (in step 625). Next, the method 600 may determine if more test images are needed (in step 630). If more test images are needed (YES branch of step 630), the method 600 may repeat steps 620, 625 and 630 one or more times.

If no more test images are needed (NO branch of step 630), the method 600 may analyze the test images to determine an "ideal" illumination intensity, or an illumination intensity that provides optimum image quality (in step 635). The method 600 may utilize a variety of techniques to determine the "ideal" illumination intensity in step 635. For example, the method 600 may utilize the test images, which were obtained from at least two different positions (e.g., a nominal height and a lowest height) in steps 615 and 625, to build a histogram of illumination intensities and may utilize the histogram to select the illumination intensity that provides maximum dynamic range and SNR in step 635.

Once the "ideal" illumination intensity is determined (in step 635), the method 600 may automatically adjust the illumination intensity provided by the camera system to the ideal illumination intensity (in step 640). In one example implementation, the method 600 may adjust the laser power of the light source 200 included within the camera system 115 (see, FIG. 2) to provide the ideal illumination intensity (in step 640).

After the illumination intensity of the camera system is set to the "ideal" intensity (in step 640), the method 600 performs a focus scan to capture a stack of images of the feature formed within/on the semiconductor substrate (in step 645). For example, the method 600 may perform a focus scan (in step 645), as described above in step 310 of FIG. 3 or step 410 of FIG. 4. After the focus scan is performed (in step 645), the method 600 analyzes the stack of images captured during the focus scan to determine image quality (in step 650). If the image quality of the stack of images is determined to be "good" or sufficient for accurate 3D reconstruction of the image (NO branch of step 655), the method 600 processes the stack of images to generate a 3D reconstruction of the feature (in step 665).

On the other hand, if the image quality is determined to be "bad" or not sufficient for accurate 3D reconstruction of the image (YES branch of step 655), the method 600 automatically adjusts the illumination intensity used by the camera system to a new illumination intensity (in step 660). In one example, the method 600 may assess the images in the image stack for pixel saturation and dynamic range (in step 650) and may dynamically adjust the illumination intensity (in step 650) based on the assessment.

Once the illumination intensity is adjusted (in step 660), the method 600 may repeat steps 645, 650, 655 and/or 660 to perform additional focus scan(s), analyze the images obtained during the additional focus scan(s) and iteratively adjust the illumination intensity until a new stack of images having "good" image quality is obtained, as shown in the embodiment of FIG. 6. When the image quality of the new stack of images is determined to be "good" or sufficient for accurate 3D reconstruction of the image (NO branch of step 655), the method 600 processes the new stack of images to generate a 3D reconstruction of the feature.

In the embodiment shown in FIG. 6, the method 600 dynamically adjusts the illumination intensity used by the camera system between focus scans. In other embodiments, the illumination intensity may be dynamically adjusted during a single focus scan by analyzing the image quality of one or more images as the images are being captured and accumulated within the image stack, and by iteratively adjusting the illumination intensity used to capture the images until a stack of images having good image quality is obtained. Once a stack of images having good image quality is obtained (NO branch of step 655), the method 600 may process the stack of images to generate a 3D reconstruction of the feature (in step 655).

Unlike conventional methods that capture images of a feature using a predetermined illumination setting, the method 600 shown in FIG. 6 dynamically adjusts the illumination intensity "on the fly," and as needed, to obtain the best quality images for a particular feature. In some embodiments, the method 600 shown in FIG. 6 may improve image quality by automatically adjusting the intensity of the illumination used by the camera system to capture images of the feature with maximum dynamic range and SNR. The method 600 shown in FIG. 6 may be performed before, during or after a focus scan is performed to capture a stack of images used for 3D reconstruction of the feature. By automatically adjusting the illumination intensity as described above, the method 600 shown in FIG. 6 improves the quality of the images used in the 3D reconstruction and improves throughput of the wafer inspection process by avoiding operator intervention (e.g., to manually adjust illumination intensity) and reducing the need for additional focus scans.

FIG. 7 illustrates one embodiment of a method 700 that may be used to automatically adjust the shape of the illumination used by a camera system to capture a stack of images of a feature formed within/on a semiconductor substrate before the images are processed to generate a 3D reconstruction of the feature. In some embodiments, the method 700 shown in FIG. 7 may be performed to adjust the shape of the off-axis illumination, which is used by the camera system to illuminate the feature with an arbitrary shape, before a focus scan is performed to capture a stack of images of the feature.

FIGS. 8A-8G are schematic diagrams depicting examples of off-axis illumination locations, which may be spaced across an aperture of a camera system for illuminating a feature formed within/on a semiconductor substrate, and example information surfaces that may be estimated (e.g., using the techniques described in FIG. 7) for the illumination detected from the feature across the aperture of the camera system. Reference will be made to the examples shown in FIGS. 8A-8G when describing certain method steps shown in FIG. 7.

Figure 8A:
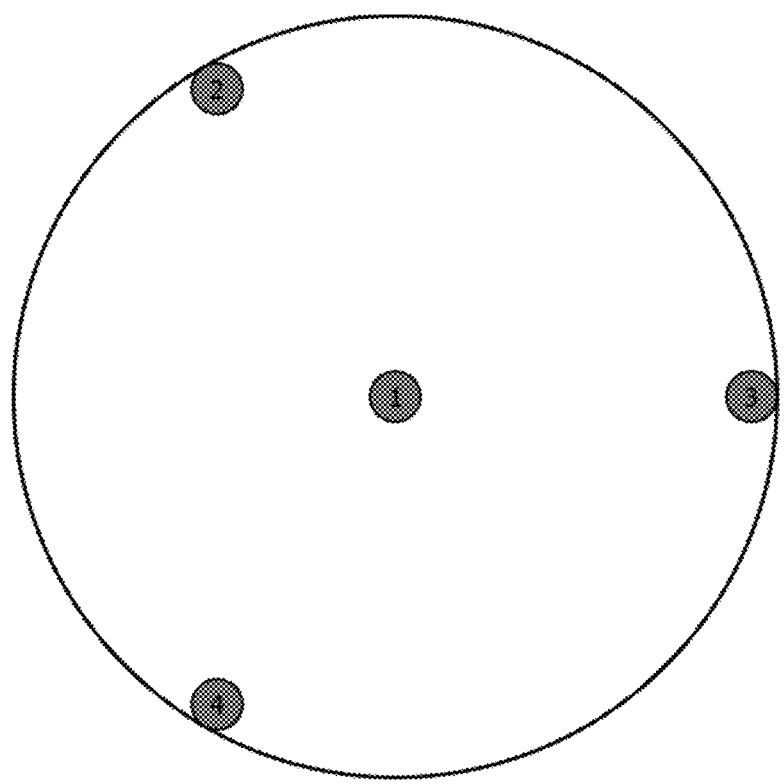
FIGS. 8A-8G are schematic diagrams depicting off-axis illumination locations, which are spaced across an aperture of a camera system for illuminating a feature formed within/on a semiconductor substrate, and information surfaces that are estimated for the illumination detected from the feature across the aperture.

In some embodiments, the method 700 may begin (in step 705) by selecting a first plurality of off-axis illumination locations spaced across an aperture of a camera system to illuminate a feature formed within/on a semiconductor substrate. In one example embodiment, the method 700 may select 3-4 off-axis illumination locations (e.g., locations 1, 2, 3 and 4), as shown in FIG. 8A. Next, the method 700 may capture a first set of images ($I_i$) of the feature while sequentially illuminating the feature at each of the first plurality of off-axis illumination locations (in step 710). One image may be captured at each off-axis location.

Once the first set of images ($I_i$) is captured, the method 700 may analyze each image within the first set of images to obtain information content ($S_i$) for the illumination detected from the feature when illuminated at each of the first plurality of off-axis illumination locations (in step 715). A variety of mathematical techniques may be used to obtain the information content ($S_i$) in step 715. For example, the information content ($S_i$) may be obtained in step 715 using the sum of the mean square slope or Fourier power spectral analysis.

Figure 8B:
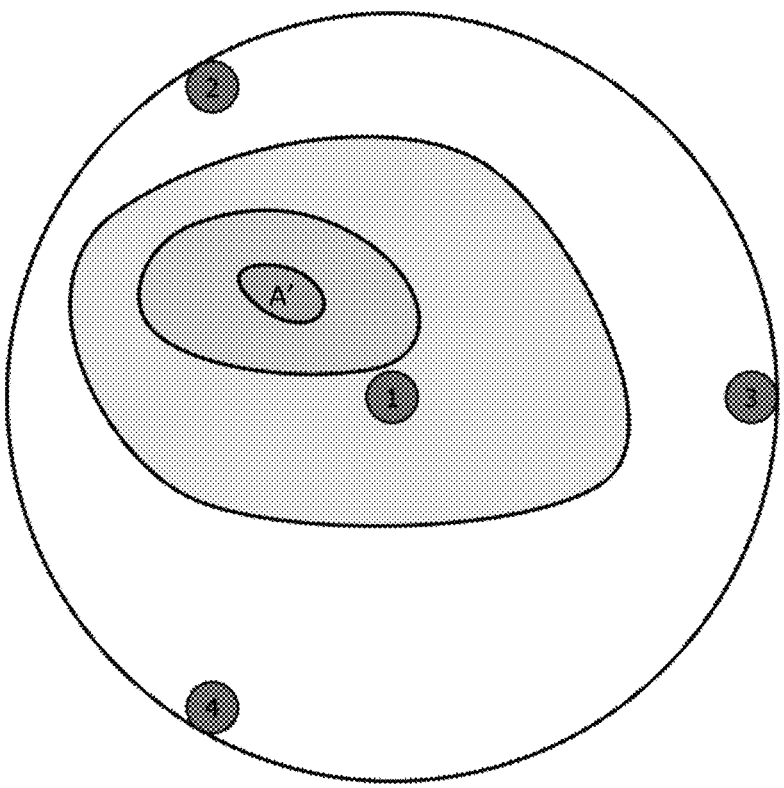

Next, the method 700 may interpolate the information content ($S_i$) obtained from the first set of images ($I_i$) across the aperture of the camera system to estimate an information surface for the illumination detected from the feature across the aperture (in step 720). FIG. 8B illustrates one example of an information surface that may be estimated by interpolating the information content ($S_i$) obtained from the first set of images ($I_i$) across the aperture of the camera system.

Figure 8C:
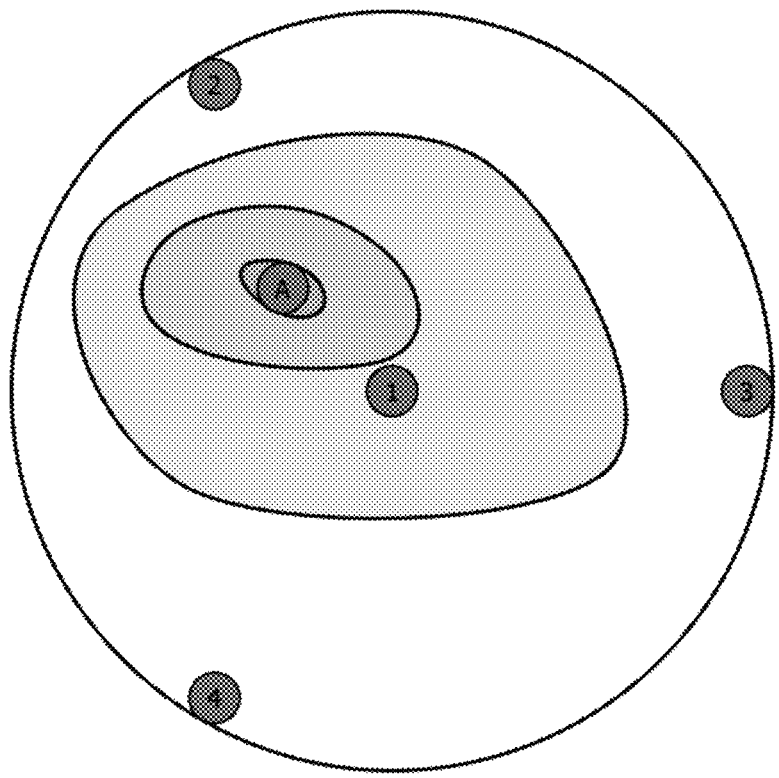
Figure 8D:
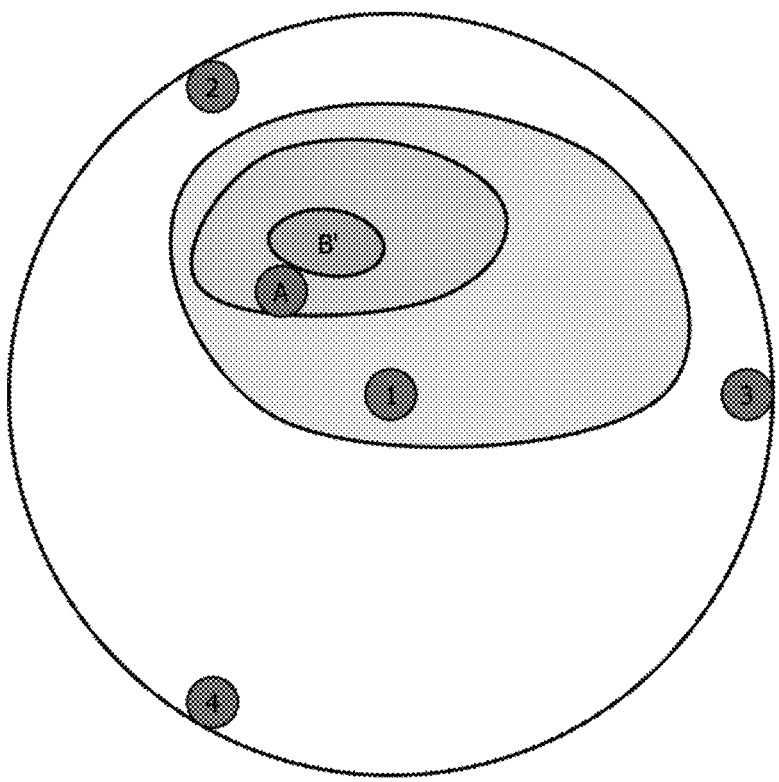

Once the information surface is generated in step 720, the method 700 may identify a first point (A) corresponding to a maximum value (A') of the information surface (or a nearby point that provides more information) (in step 725), as shown for example in FIGS. 8B and 8C. Next, the method 700 may capture an additional image ($I_A$) of the feature while illuminating the feature from an off-axis illumination location corresponding to the first point (A) (in step 730), analyze the image ($I_A$) to obtain information content ($S_A$) for the illumination detected from the feature when illuminated from the off-axis illumination location corresponding to the first point (A) (in step 735), and interpolate the information content ($S_i+S_A$) obtained from all images ($I_i+I_A$) across the aperture of the camera system to estimate a new information surface for the illumination detected from the feature across the aperture (in step 740), as shown for example in FIG. 8D.

Next, the method 700 may determine if a termination condition has been satisfied (in step 745) for a given metric of image quality determined for the last image (e.g., image $I_A$) obtained by the camera system. A variety of metrics may be used to ascertain the image quality, such as for example, contrast, average squared slope, SNR, pixel saturation, dynamic range, focus, etc. As used herein, a "termination condition" is satisfied when a metric of image quality (e.g., contrast) determined for the last image (e.g., image $I_A$) obtained by the camera system provides little to no improvement over the metric of image quality determined for a previous image or set of images (e.g., the first set images $I_i$) obtained by the camera system. In one example, a termination condition may be satisfied (in step 745) when the metric of image quality determined for the last image obtained by the camera system provides less than 10-30% improvement over the metric of image quality determined for a previous image or set of images obtained by the camera system. If the termination condition is satisfied (YES branch of step 745), the method 700 may use the new information surface (e.g., the information surface shown in FIG. 8D) to define the shape of the off-axis illumination provided by the camera system (in step 770) before a focus scan is performed to capture a stack of images of the feature.

Figure 8E:
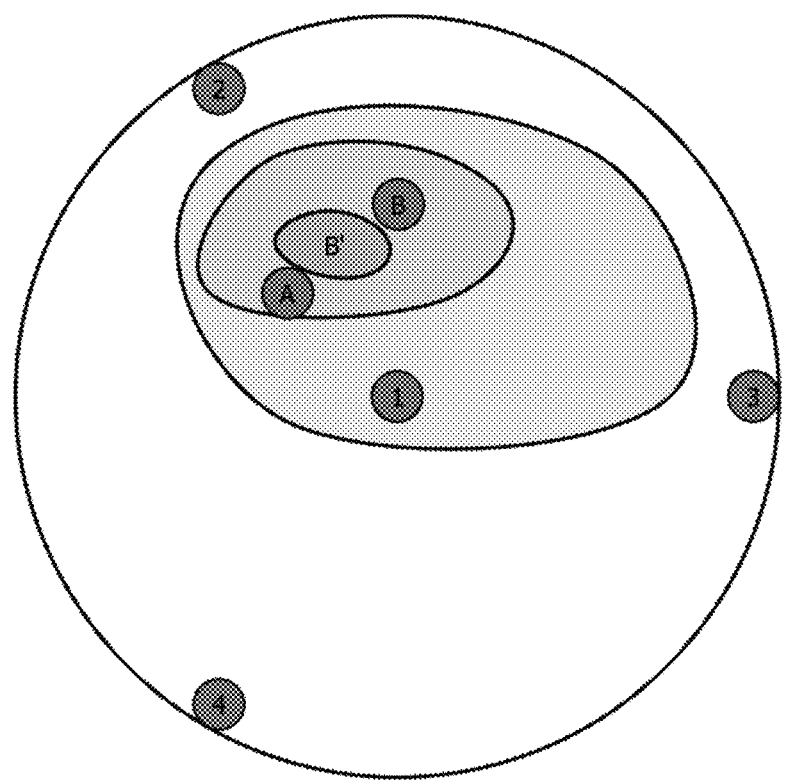
Figure 8F:
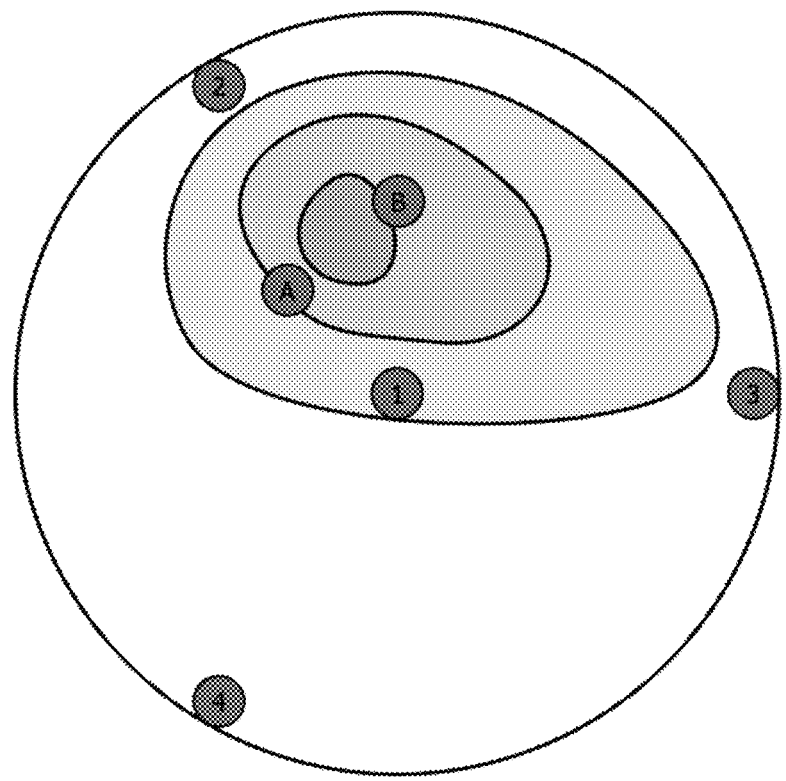
Figure 8G:
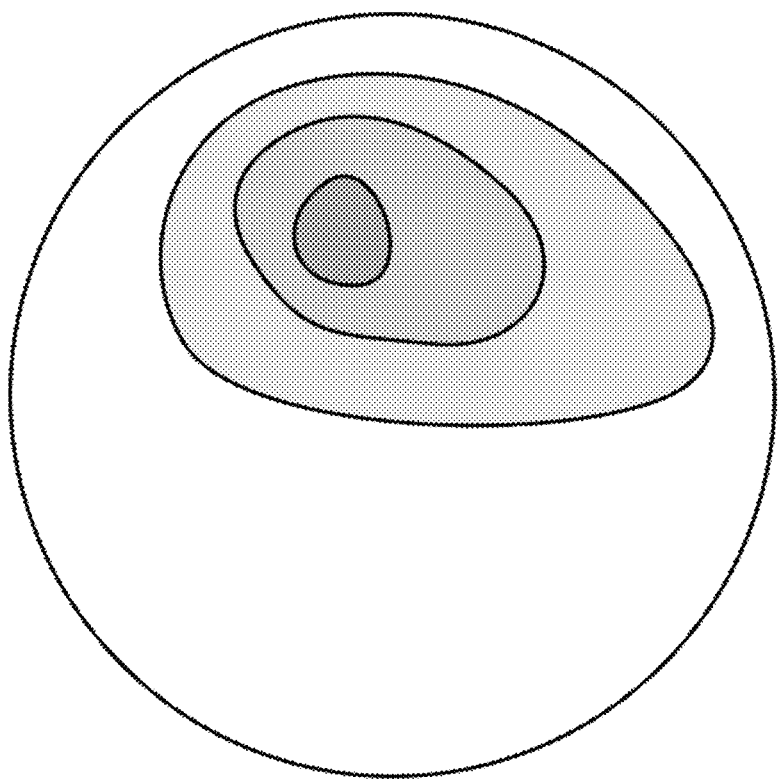

If the termination condition has not been satisfied (NO branch of step 745), the method 700 may identify a second point (B) corresponding to a maximum value (B') of the new information surface (or a nearby point that provides more information) (in step 750), as shown for example in FIG. 8E. Next, the method 700 may capture another additional image ($I_B$) of the feature while illuminating the feature from an off-axis illumination location corresponding to the second point (B) (in step 755), analyze the image ($I_B$) to obtain information content ($S_B$) for the illumination detected from the feature when illuminated from the off-axis illumination location corresponding to the second point (B) (in step 760), and interpolate the information content ($S_i+S_A+S_B$) obtained from all images ($I_i+I_A+I_B$) across the aperture of the camera system to estimate a new information surface for the illumination detected from the feature across the aperture (in step 765), as shown for example in FIG. 8F.

Next, the method 700 may determine if the termination condition has been satisfied (in step 745) for a given metric of image quality determined for the last image (e.g., image $I_B$) obtained by the camera system. If the termination condition is satisfied (YES branch of step 745), the method 700 may use the new information surface (e.g., the information surface shown in FIGS. 8F and 8G) to define the shape of the off-axis illumination provided by the camera system (in step 770) before a focus scan is performed to capture a stack of images of the feature. If the termination condition has not been satisfied (NO branch of step 745), the method 700 may repeat steps 750, 755, 760 and 765 one or more times until the termination condition is satisfied (in step 745).

Unlike conventional methods that capture images of a feature using a predetermined illumination shape, the method 700 shown in FIG. 7 dynamically adjusts the illumination shape "on the fly," and as needed, to obtain the best quality images for a particular feature. The method 700 shown in FIG. 7 may generally be performed before a focus scan is performed to capture a stack of images used for 3D reconstruction of the feature. In some embodiments, the method 700 shown in FIG. 7 may improve the dynamic range and SNR of the images captured during the focus scan by automatically adjusting and adapting the shape of the off-axis illumination used by the camera system to the shape of the feature before the focus scan is performed. By automatically adjusting the shape of the off-axis illumination, as described above, the method 700 shown in FIG. 7 improves the quality of the images used in the 3D reconstruction and improves throughput of the wafer inspection process by avoiding operator intervention (e.g., to manually adjust illumination shape) and avoiding the need to perform additional focus scans.

It will be recognized that the method embodiments disclosed herein may be utilized before, during or after a wide range of substrates have been processed in a semiconductor processing unit. The substrate may be any substrate for which the patterning of the substrate is desirable. For example, in one embodiment, the substrate may be a semiconductor substrate having one or more semiconductor processing layers (all of which together may comprise the substrate) formed thereon. Thus, in one embodiment, the substrate may be a semiconductor substrate that has been subject to multiple semiconductor processing steps which yield a wide variety of structures and layers, all of which are known in the substrate processing art, and which may be considered to be part of the substrate. For example, in one embodiment, the substrate may be a semiconductor wafer having one or more semiconductor processing layers formed thereon.

Further modifications and alternative embodiments of the present disclosure will be apparent to those skilled in the art in view of this description. Accordingly, this description is to be construed as illustrative only and is for the purpose of teaching those skilled in the art the manner of carrying out the techniques described herein. It is to be understood that the systems and methods described herein are to be taken as presently preferred embodiments. Equivalent techniques may be substituted for those illustrated and described herein and certain features of the present disclosure may be utilized independently of the use of other features, all as would be apparent to one skilled in the art after having the benefit of this description.

What is claimed is:

1. A method for inspecting features formed within and/or on a semiconductor substrate, the method comprising:
    capturing a stack of images of a feature formed within and/or on the semiconductor substrate using a camera system, wherein the camera system utilizes a plurality of parameters to capture the stack of images;
    analyzing one or more images in the stack of images, during or after said capturing the stack of images, to determine if one or more of the parameters used by the camera system should be adjusted to capture the feature more accurately, wherein if said analyzing determines that one or more of the parameters should be adjusted, the method further comprises:
        determining optimum settings for the one or more parameters to capture the feature depicted in the stack of images more accurately; and
        automatically adjusting the one or more parameters in accordance with the optimum settings before the camera system is utilized to capture additional images of the feature, wherein the additional images are included within the stack of images;
    assigning weights to each image within the stack of images to specify whether or not geometrical information is provided within the image for the feature; and
    using the weights assigned to the images to perform one or more of the following: (a) identify unexplored areas of the semiconductor substrate or the feature, and (b) suggest different camera poses or rotating mirror tilt angles for capturing the unexplored areas of the semiconductor substrate or the feature.

2. The method of claim 1, wherein if said analyzing determines that the one or more parameters used by the camera system do not need adjustment, the method further comprises processing the stack of images to generate a three-dimensional (3D) reconstruction of the feature.

3. The method of claim 2, wherein as each image within the stack of images is captured, the method further comprises:
    filtering each image to determine whether: (a) the image should be included within the stack of images and used in the 3D reconstruction of the feature, or (b) the image should be discarded from the stack of images;
    dynamically determining when a sufficient number of images have been included within the stack of images for the 3D reconstruction of the feature; and
    processing the stack of images to generate the 3D reconstruction of the feature when the sufficient number of images have been included within the stack of images.

4. The method of claim 1, wherein after automatically adjusting the one or more parameters in accordance with the optimum settings, the method further comprises:
    analyzing the additional images to determine if one or more of the parameters used by the camera system should be adjusted to capture the feature depicted in the stack of images more accurately.

5. The method of claim 4, wherein if said analyzing the additional images determines that the one or more parameters used by the camera system do not need adjustment, the method further comprises processing the stack of images to generate a three-dimensional (3D) reconstruction of the feature.

6. The method of claim 4, wherein if said analyzing the additional images determines that the one or more parameters used by the camera system should be adjusted to capture the feature more accurately, the method further comprises repeating said determining optimum settings for the one or more parameters, said automatically adjusting the one or more parameters in accordance with the optimum settings, said capturing the additional images of the feature, and said analyzing the additional images until said analyzing determines that the one or more parameters used by the camera system do not need adjustment.

7. The method of claim 1, wherein the one or more parameters used by the camera system comprise one or more of the following: illumination intensity, illumination shape, pupil illumination sigma, focus height, aperture, exposure time, image resolution, and camera pose.

8. The method of claim 1, wherein said analyzing the one or more images in the stack of images determines which of the one or more parameters used by the camera system should be adjusted to improve an image quality of the images obtained of the feature and included within the stack of images.

9. The method of claim 8, wherein the one or more parameters used by the camera system comprise one or more of the following: illumination intensity, illumination shape, pupil illumination sigma, focus height, aperture, exposure time, image resolution, and camera pose.

10. The method of claim 1, wherein said automatically adjusting the one or more parameters in accordance with the optimum settings comprises:
    automatically adjusting an illumination intensity used by the camera system to capture images of the feature with maximum dynamic range and signal-to-noise ratio.

11. The method of claim 1, wherein said automatically adjusting the one or more parameters in accordance with the optimum settings comprises:
    automatically adjusting an illumination shape used by the camera system to capture images of the feature, wherein the illumination shape is automatically adjusted to a shape of the feature to improve dynamic range and signal-to-noise ratio.

12. The method of claim 1, wherein said automatically adjusting the one or more parameters in accordance with the optimum settings comprises:
    automatically adjusting a pupil illumination sigma used by the camera system to capture images of the feature, wherein the pupil illumination sigma is automatically adjusted to optimize illumination used by the camera system to capture the images of the feature.

13. The method of claim 1, wherein said automatically adjusting the one or more parameters in accordance with the optimum settings comprises:
    automatically adjusting an image resolution used by the camera system to capture images of the feature, wherein the image resolution is automatically adjusted to an optimum image resolution for a given feature size.

14. The method of claim 1, wherein said automatically adjusting the one or more parameters in accordance with the optimum settings comprises:
    automatically adjusting a focal length used by the camera system to capture images of the feature, wherein the focal length is automatically adjusted to capture the feature with the sharpest clarity.

15. The method of claim 14, wherein said determining the optimum settings for the one or more parameters comprises:
performing a two dimensional (2D) discrete Fourier analysis on each image in the stack of images;
determining which image in the stack of images is most in-focus by finding the image with a highest amplitude of high frequency components in the 2D discrete Fourier analysis; and
determining, based on the image with the highest amplitude of high frequency components in the 2D discrete Fourier analysis, the focal length for capturing the feature with the sharpest clarity.

16. The method of claim 1, wherein said automatically adjusting the one or more parameters in accordance with the optimum settings comprises:
automatically adjusting a camera pose used by the camera system to capture images of the feature or unexplored areas surrounding the feature.

* * * * *